US012469205B2

(12) United States Patent
Smith-Lacey et al.

(10) Patent No.: US 12,469,205 B2
(45) Date of Patent: Nov. 11, 2025

(54) INTERSECTION TESTING IN A RAY TRACING SYSTEM USING OFFSET INTERSECTION DISTANCES

(71) Applicant: Imagination Technologies Limited, Kings Langley (GB)

(72) Inventors: Peter Smith-Lacey, Hertfordshire (GB); Simon Fenney, Hertfordshire (GB); Gregory Clark, Hertfordshire (GB); Rostam King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 301 days.

(21) Appl. No.: 18/114,402

(22) Filed: Feb. 27, 2023

(65) Prior Publication Data
US 2023/0334756 A1    Oct. 19, 2023

(30) Foreign Application Priority Data

Feb. 25, 2022 (GB) ..................................... 2202657
Feb. 25, 2022 (GB) ..................................... 2202658
Feb. 25, 2022 (GB) ..................................... 2202659

(51) Int. Cl.
*G06T 15/06* (2011.01)
*G06T 15/00* (2011.01)
*G06T 17/20* (2006.01)
(52) U.S. Cl.
CPC ............ *G06T 15/06* (2013.01); *G06T 15/005* (2013.01); *G06T 17/20* (2013.01); *G06T 2210/21* (2013.01)

(58) Field of Classification Search
CPC ....... G06T 15/06; G06T 15/005; G06T 17/20; G06T 2210/21
See application file for complete search history.

(56) References Cited

U.S. PATENT DOCUMENTS 8,059,122 B1 * 11/2011 MacGillivray ......... G06T 15/06
345/424
12,067,669 B2   8/2024 Laine et al.
2008/0259075 A1  10/2008 Fowler et al.
(Continued)

OTHER PUBLICATIONS

Vasilakis et al., Depth-fighting Aware Methods for Multi-fragment Rendering, 2012 (Year: 2012).*

(Continued)

*Primary Examiner* — Phong X Nguyen
(74) *Attorney, Agent, or Firm* — Potomac Law Group, PLLC; Vincent M DeLuca

(57) ABSTRACT

A method and an intersection testing module for performing intersection testing in a ray tracing system determines a first offset intersection distance which is equal to a sum of an intersection distance at which a ray intersects a first primitive and a first offset which is dependent upon the orientation of the first primitive. A second offset intersection distance is determined which is equal to a sum of an intersection distance at which the ray intersects a second primitive and a second offset which is dependent upon the orientation of the second primitive. The determined first and second offset intersection distances are compared to select the intersection of the ray with one of the first and second primitives.

20 Claims, 12 Drawing Sheets

(56) References Cited

U.S. PATENT DOCUMENTS

| | | | |
|---|---|---|---|
| 2011/0267347 A1* | 11/2011 | Purcell | G06T 15/06 345/426 |
| 2013/0113801 A1 | 5/2013 | Monson et al. | |
| 2016/0260245 A1 | 9/2016 | DeCell et al. | |
| 2018/0089885 A1* | 3/2018 | Wald | G06T 1/60 |
| 2019/0333263 A1* | 10/2019 | Melkote Krishnaprasad | G06F 3/012 |
| 2020/0051314 A1* | 2/2020 | Laine | G06T 15/005 |
| 2020/0193683 A1* | 6/2020 | Saleh | G06T 15/005 |
| 2021/0390759 A1* | 12/2021 | Muthler | G06T 17/10 |
| 2022/0351458 A1 | 11/2022 | Smith-Lacey et al. | |
| 2022/0392146 A1* | 12/2022 | Bruce | G06T 15/06 |
| 2023/0005209 A1* | 1/2023 | Valsaraju | G06T 15/005 |
| 2023/0081791 A1* | 3/2023 | Burgess | G06T 17/10 345/418 |
| 2023/0298258 A1 | 9/2023 | Laine et al. | |
| 2023/0334756 A1* | 10/2023 | Smith-Lacey | G06T 17/20 |
| 2023/0334757 A1 | 10/2023 | Smith-Lacey et al. | |
| 2023/0359496 A1 | 11/2023 | Majewski et al. | |
| 2024/0362851 A1 | 10/2024 | Muthler et al. | |

OTHER PUBLICATIONS

Woop et al., Watertight Ray/Triangle Intersection, 2013 (Year: 2013).*

Sjoholm; "Best Practices: Using NVIDIA RTX Ray Tracing (Updated); URL:https://developer.nvidia.com/blog/best-practices-using-nvidia-rtx-ray-tracing/"; Aug. 10, 2020; pp. 1-10.

Woop et al; "Watertight Ray/Triangle Intersection"; Journal of Computer Graphics Techniques; Jun. 28, 2013; Retrieved from the Internet: URL:http://jcgt.org/published/0002/01/05/paper.pdf; vol. 2; No. 1; 2013; pp. 65-82.

Agelek, Rainer: "On Orienting Edges of Unstructured Two- and Three-Dimensional Meshes", Mar. 2018, ACM Transactions on Mathematical Software 44, 1, Article 5, pp. 5: 1-5:22 (Year: 2018).

Chen, X. et al.: "Polygon offsetting by computing winding numbers", In International Design Engineering Technical Conferences and Computers and Information in Engineering Conference Jan. 1, 2005 (vol. 4739, pp. 565-575).

Ern, A. et al.: "Finite elements I: Approximation and interpolation", Springer Nature; Feb. 18, 2021.

* cited by examiner

INTERSECTION TESTING IN A RAY TRACING SYSTEM USING OFFSET INTERSECTION DISTANCES

CROSS-REFERENCE TO RELATED APPLICATIONS AND CLAIM OF PRIORITY

This application claims priority under 35 U.S.C. 119 from United Kingdom patent application Nos. GB2202657.9, GB2202658.7 and GB2202659.5, all filed on 25 Feb. 2022, which are herein incorporated by reference in their entirety.

FIELD

The present disclosure is directed to techniques of performing intersection testing in a ray tracing system.

BACKGROUND

Ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. Leaf nodes of the acceleration structure represent regions bounding one or more primitives in the scene, and have pointers to the bounded primitives.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The objects may be represented using "primitives". A primitive denotes a unit of geometry in the system, and may for example be a convex polygon. Often the primitives are triangles, but they may be other shapes, e.g. squares, rectangles, pentagons, hexagons, etc. Furthermore, some primitives might not be convex polygons, or even polygons. For example, a primitive could be a disc or some other surface or volume.

A ray (r) can be defined as r=O+Dt where O is a vector which represents the ray origin, D is a vector which represents the ray direction and t represents a distance, relative to the magnitude of D, along the ray from the origin. A primitive can be represented as a convex polygon (e.g. triangle) defined by an ordered set of planar vertices whereby consecutive pairs of vertices define the primitive edges and the overall vertex order gives a winding order for the primitive. An orientation of the primitive (i.e. clockwise or anticlockwise) with respect to a ray depends on both the winding order of the primitive and the origin and direction of the ray. A flag may be set in the ray tracing system (e.g. by a user) to indicate whether a clockwise or an anticlockwise orientation corresponds to a front-facing primitive. The winding order of the primitive can be used, with a predetermined orientation as front-facing (either clockwise or anticlockwise), to mark one side of the primitive as the front face and the other as the back face. Depending on which side is viewed by a given ray determines whether that primitive is front-facing or back-facing, clockwise or anticlockwise, at least from the viewpoint of that ray.

To determine whether a ray intersects a planar primitive, an intersection point of a ray and the plane containing the primitive can be determined, and then it can be determined whether the intersection point is inside the primitive. In this way, given a ray/primitive pair, a primitive intersection stage can determine whether the ray intersects the primitive and outputs this as a "hit" result. When a ray versus primitive intersection occurs (i.e., hit is set) the primitive intersection stage may also calculate additional attributes such as orientation (either clockwise/anticlockwise or front-facing/back-facing), intersection distance, and/or barycentric coordinates indicating the position of the intersection point on the primitive. In particular, a distance calculation may generate a floating-point value indicating the multiple of ray lengths (e.g. indicated with a value of t) required to travel from the ray origin to the intersection point (this may be negative if the intersection occurs behind the origin).

A ray may intersect more than one primitive in the scene. So following the primitive intersection stage, if an intersection is found between a ray and a primitive, an intersection selection stage determines whether the new intersection point or an old intersection point for the ray should be selected. Typically, the closer of the two intersections is selected (i.e. the first intersection that the ray encounters in the scene is selected). The term "closer" here may mean closer to the ray origin or it may mean closer to minus infinity depending upon the implementation (these two notions are often equivalent as it is customary, but not necessary, for the minimum distance of a ray to be greater than or equal to zero). The selected intersection is then used for further processing of the ray, whilst the unselected intersection is discarded. This process is also known as hidden-surface determination, shown-surface determination, hidden-surface removal (HSR), occlusion culling (OC) or visible-surface determination (VSD). The current closest intersection point is a per-ray attribute and therefore may be stored as ray data.

The "closer" of two intersections may be selected purely on the basis of the intersection distance values output from the primitive intersection stage. However, there are some situations in which either this is not possible or it does not provide good results to do so. For example, if the intersection distances for a ray to two different primitives are equal then it is not possible to distinguish between them on the basis of the intersection distances alone. In this situation, some form of tie-break rule may be used, but known tie-breaking rules do not always select the "best" intersection in terms of reducing perceptual rendering artefacts.

It is noted that it is not uncommon for the intersection distances for a ray to two different primitives to be equal because often objects are represented with multiple primitives, e.g. with meshes of primitives, resulting in shared vertices which define two or more of the primitives. Furthermore, primitives can have shared edges, i.e., edges where both endpoints are shared vertices. If a ray intersects a point on a shared edge or on a shared vertex then the intersection distances to the two primitives sharing the edge or vertex should be equal. If the intersection tests ensure that a ray that intersects a point on a shared edge or shared vertex intersects at least one of the primitives then the intersection tests are described as being "watertight". If the intersection tests ensure that a ray that intersects a point on a shared edge or a shared vertex of a closed fan intersects one (and only one) of the primitives then the intersection tests are described as being "non-redundantly watertight", noting that in this case only a (strict) subset of its boundary may be considered part of a primitive. A (closed) fan may be encoded as (a subset of) a list of vertices, with or without a repeated vertex (indicating the central vertex of the fan), and with either an implicit primitive topology, e.g., given by the vertex order (e.g., a list of vertex tuples, or as a triangle fan or triangle strip is compactly represented in a computer graphics system), or an explicit primitive topology, e.g., given by (a subset of) a list of vertex index tuples.

If a ray which intersected a point on a shared edge was found to intersect zero primitives then it may appear as though the primitive mesh has a hole in it, such that a colour behind the primitive mesh can be seen through the mesh in the rendered image (this can occur for non-watertight intersection tests, but not for watertight intersection tests). These sorts of rendering errors can be very noticeable, e.g. if the colour behind the primitive mesh is significantly different to the colour of the primitive mesh. Furthermore, if a ray which intersected a point on a shared edge (which may include a vertex defining that edge) was found to intersect more than one primitive (which may be referred to as a "double intersection") then the colour that is rendered at positions on that shared edge may depend upon the order in which the primitives are tested for intersection, such that the rendering may become non-deterministic. These sorts of rendering errors can be detrimental to the perceived quality of the rendered image. Further reasons to have non-redundant watertight intersection tests include: (i) to avoid redundant work, and (ii) to avoid shading discontinuities at any double/multiple hits in transparent objects resulting from duplicated intersections. The testing of a ray for intersection with a first primitive is normally performed independently of the testing of the ray for intersection with a second primitive, and it is noted that ensuring watertightness, and specifically non-redundant watertightness, for the intersection tests is not trivial.

Another problem with solely using the intersection distances to perform intersection selection is that there may be some errors in the calculated intersection distances. For example, the distance calculations which determine the intersection distances typically operate on floating point numbers, which may be of significantly different scales. When floating point numbers are used in calculations, some rounding of the values normally occurs, which can introduce errors in the results. The rounding errors are particularly significant when values with very differing magnitudes are used in the same operation. These errors in the calculations of the intersection distances can cause errors in the determination of which intersection is the closest. The errors in the determination of which intersection is the closest can be referred to as "Z fighting" and can result in rendering artefacts where a surface that should be hidden by another surface at a pixel position is visible at that pixel position. Z fighting tends to occur when two overlapping surfaces are close to each other.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a computer-implemented method of performing intersection testing in a ray tracing system, the method comprising:
  determining a first offset intersection distance which is equal to a sum of an intersection distance at which a ray intersects a first primitive and a first offset which is dependent upon the orientation of the first primitive;
  determining a second offset intersection distance which is equal to a sum of an intersection distance at which the ray intersects a second primitive and a second offset which is dependent upon the orientation of the second primitive; and
  comparing the determined first and second offset intersection distances to select the intersection of the ray with one of the first and second primitives.

Said determining the first offset intersection distance may comprise determining the intersection distance at which the ray intersects the first primitive, and wherein said determining the second offset intersection distance may comprise determining the intersection distance at which the ray intersects the second primitive.

Said determining the first offset intersection distance may comprise offsetting the determined intersection distance at which the ray intersects the first primitive by the first offset.

Said determining the second offset intersection distance may comprise offsetting the determined intersection distance at which the ray intersects the second primitive by the second offset.

The orientation of the first primitive may be different to the orientation of the second primitive, and wherein the first offset may be different to the second offset.

The first offset may be zero and the second offset may be non-zero. The second offset may be zero and the first offset may be non-zero.

If the first offset is non-zero, then an offset with the same sign as the first offset may be used for determining offset intersection distances for any primitives which have the same orientation as the first primitive. If the second offset is non-zero, then an offset with the same sign as the second offset may be used for determining offset intersection distances for any primitives which have the same orientation as the second primitive.

If the first offset is non-zero, then an offset with the same sign and mantissa as the first offset may be used for determining offset intersection distances for any primitives which have the same orientation as the first primitive. If the second offset is non-zero, then an offset with the same sign and mantissa as the second offset may be used for determining offset intersection distances for any primitives which have the same orientation as the second primitive.

Each of the offsets may have an exponent which scales with an exponent of the intersection distance with which it is to be summed.

If the first offset is non-zero, then an offset with the same sign, mantissa and exponent as the first offset may be used for determining offset intersection distances for any primitives which have the same orientation as the first primitive. If the second offset is non-zero, then an offset with the same sign, mantissa and exponent as the second offset may be used for determining offset intersection distances for any primitives which have the same orientation as the second primitive.

If the first primitive has the particular orientation then the first offset may be less than if the first primitive does not have the particular orientation. If the second primitive has the particular orientation then the second offset may be less than if the second primitive does not have the particular orientation.

Said comparing the determined first and second offset intersection distances may comprise identifying which of the determined first and second offset intersection distances is lower, wherein the intersection corresponding to the identified offset intersection distance may be selected.

A primitive which has said particular orientation may be a front-facing primitive, and a primitive which has an orientation that is different to said particular orientation may be a back-facing primitive.

The method may further comprise determining that the ray intersects the first and second primitives.

If the determined first and second offset intersection distances are equal, the intersection of the ray with one of the first and second primitives may be selected based on unique primitive IDs which are associated with the first and second primitives.

The method may further comprise using the selected intersection in the ray tracing system for rendering an image.

There is provided an intersection testing module, for use in a ray tracing system, the intersection testing module comprising:
    intersection selection logic configured to:
        determine a first offset intersection distance which is equal to a sum of an intersection distance at which a ray intersects a first primitive and a first offset which is dependent upon the orientation of the first primitive;
        determine a second offset intersection distance which is equal to a sum of an intersection distance at which the ray intersects a second primitive and a second offset which is dependent upon the orientation of the second primitive; and
        compare the determined first and second offset intersection distances to select the intersection of the ray with one of the first and second primitives.

The intersection testing module may further comprise intersection determination logic configured to:
    determine that the ray intersects the first primitive and determine the intersection distance at which the ray intersects the first primitive; and
    determine that the ray intersects the second primitive and determine the intersection distance at which the ray intersects the second primitive.

The intersection selection logic may be configured to compare the determined first and second offset intersection distances to select the intersection of the ray with one of the first and second primitives by identifying which of the determined first and second offset intersection distances is lower, wherein the intersection corresponding to the identified offset intersection distance may be selected.

There may be provided an intersection testing module configured to perform any of the methods described herein.

There may be provided a computer-implemented method of performing intersection testing in a ray tracing system, the method comprising:
    if a difference between an intersection distance at which a ray intersects a first primitive and an intersection distance at which the ray intersects a second primitive satisfies a comparison condition with respect to a threshold, and if the orientations of the first and second primitives are different, selecting the intersection of the ray with the one of the first and second primitives which has a particular orientation.

There may be provided a computer-implemented method of performing intersection testing in a ray tracing system, the method comprising:
    determining that an intersection distance at which a ray intersects a first primitive is equal to an intersection distance at which the ray intersects a second primitive;
    determining that the orientations of the first and second primitives are different; and
    selecting the intersection of the ray with one of the first and second primitives on the basis that said one of the first and second primitives has a particular orientation.

There may be provided an intersection testing module, for use in a ray tracing system, the intersection testing module comprising:
    intersection selection logic configured to, if a difference between an intersection distance at which a ray intersects a first primitive and an intersection distance at which the ray intersects a second primitive satisfies a comparison condition with respect to a threshold, and if the orientations of the first and second primitives are different, select the intersection of the ray with the one of the first and second primitives which has a particular orientation.

There may be provided an intersection testing module, for use in a ray tracing system, the intersection testing module comprising:
    intersection selection logic configured to:
        determine that an intersection distance at which a ray intersects a first primitive is equal to an intersection distance at which the ray intersects a second primitive;
        determine that the orientations of the first and second primitives are different; and
        select the intersection of the ray with one of the first and second primitives on the basis that said one of the first and second primitives has a particular orientation.

There may be provided a computer-implemented method of performing intersection testing in a ray tracing system, the method comprising:
    determining that a difference between an intersection distance at which a ray intersects a first primitive and an intersection distance at which the ray intersects a second primitive satisfies a comparison condition with respect to a threshold;

determining that the orientations of the first and second primitives are different; and selecting the intersection of the ray with one of the first and second primitives on the basis that said one of the first and second primitives has a particular orientation.

There may be provided an intersection testing module, for use in a ray tracing system, the intersection testing module comprising:

intersection selection logic configured to:

determine that a difference between an intersection distance at which a ray intersects a first primitive and an intersection distance at which the ray intersects a second primitive satisfies a comparison condition with respect to a threshold;

determine that the orientations of the first and second primitives are different; and select the intersection of the ray with one of the first and second primitives on the basis that said one of the first and second primitives has a particular orientation.

The intersection testing module may be embodied in hardware on an integrated circuit. There may be provided a method of manufacturing, at an integrated circuit manufacturing system, an intersection testing module. There may be provided an integrated circuit definition dataset that, when processed in an integrated circuit manufacturing system, configures the system to manufacture an intersection testing module. There may be provided a non-transitory computer readable storage medium having stored thereon a computer readable description of an intersection testing module that, when processed in an integrated circuit manufacturing system, causes the integrated circuit manufacturing system to manufacture an integrated circuit embodying an intersection testing module.

There may be provided an integrated circuit manufacturing system comprising: a non-transitory computer readable storage medium having stored thereon a computer readable description of the intersection testing module; a layout processing system configured to process the computer readable description so as to generate a circuit layout description of an integrated circuit embodying the intersection testing module; and an integrated circuit generation system configured to manufacture the intersection testing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
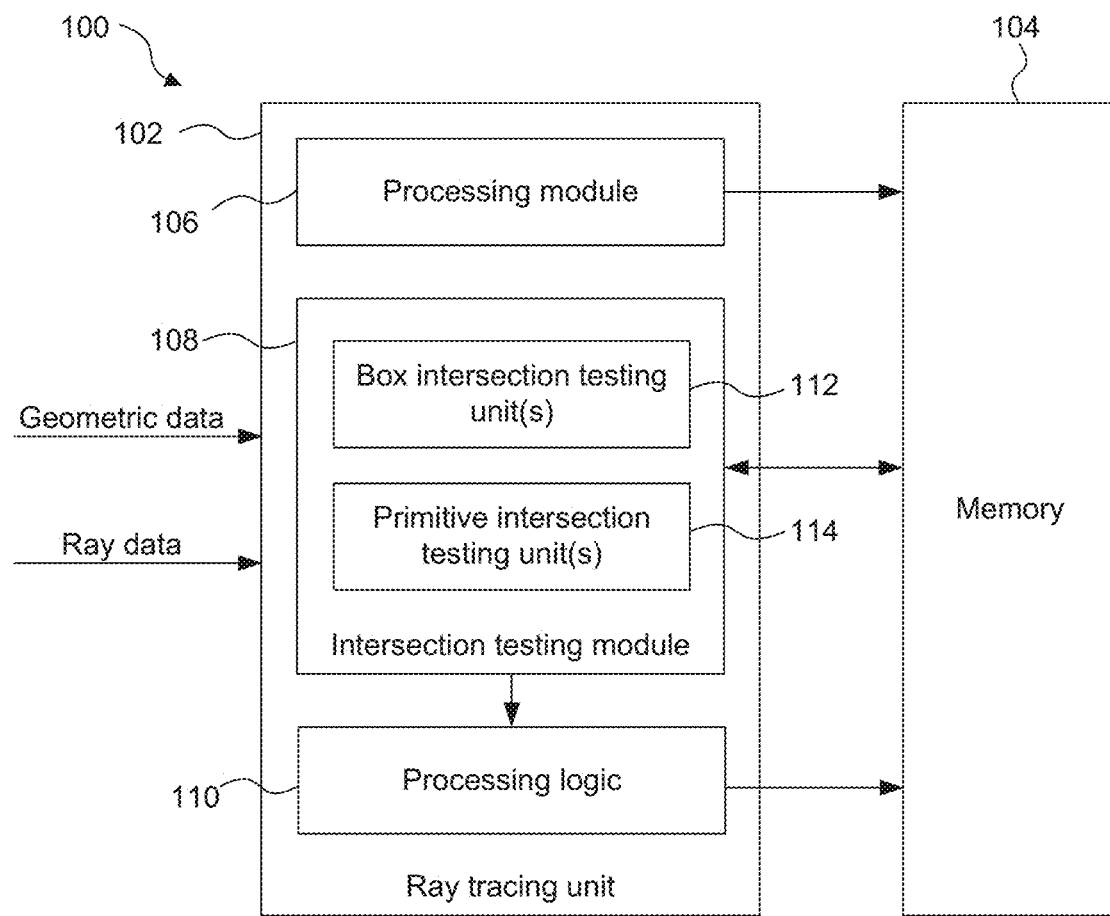
FIG. 1 shows a ray tracing system according to examples described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows a ray tracing system 100 comprising a ray tracing unit 102 and a memory 104. The ray tracing unit 102 comprises a processing module 106, an intersection testing module 108 and processing logic 110. The intersection testing module 108 comprises one or more box intersection testing units 112, and one or more primitive intersection testing units 114. In operation the ray tracing unit 102 receives geometric data defining objects within the 3D scene. The ray tracing unit 102 also receives ray data defining rays that are to be tested for intersection. The rays may be primary rays or secondary rays. The processing module 106 is configured to generate an acceleration structure based on the geometric data, and to send the acceleration structure to the memory 104 for storage therein. After the acceleration structure has been stored in the memory 104, the intersection testing module 108 can retrieve nodes (e.g. comprising data defining axis-aligned boxes corresponding to the nodes) of the acceleration structure from the memory 104 to perform intersection testing of rays against the retrieved nodes. To avoid reading in the whole acceleration structure at a time, the intersection testing module 108 retrieves a subset of the boxes from one level of the acceleration structure from memory 104 at each stage, based on the results of previous intersection tests. The box intersection testing unit(s) 112 perform intersection tests to determine whether or not a ray intersects each of the bounding boxes corresponding to nodes of the acceleration structure (where a miss can cull vast swathes of the hierarchical acceleration structure). If it is determined that a leaf node is intersected then the primitive intersection testing unit(s) 114 perform one or more primitive intersection tests to determine which object(s) (if any) the ray intersects. In this example, the primitives are triangles, although it is noted that in other examples, the primitives could be other shapes, e.g. other convex planar polygons (such as squares, rectangles, pentagons, hexagons, etc), non-convex polygons or non-polygonal planar shapes (e.g. discs), or even non-planar shapes (e.g. shapes which are homeomorphic to a disc). Furthermore, the primitives may be assumed to be nondegenerate (i.e. 2D), as intersections with degenerate primitives (i.e. 1D or 0D primitives) can be treated as misses. The results of the intersection tests indicate which object in the scene a ray intersects, and the results may also indicate other intersection data, such as a position on the object at which the ray intersects the object (e.g. Barycentric coordinates), may also indicate a distance, e.g., Euclidean or as a (signed) multiple of ray lengths, along the ray that the intersection occurs, and may also indicate the perceived orientation of the object from the ray's point of view (e.g., clockwise/anticlockwise or front/back facing). In some instances, the intersection determination may be based on whether the distance along the ray that the intersection occurs is between minimal and maximal clipping distances for the ray (which may be referred to as $t_{min}$ and $t_{max}$). The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

In the examples described herein the ray tracing system uses an acceleration structure in order to reduce the number of intersection tests that need to be performed for a ray against primitives. However, it is noted that some other examples might not use an acceleration structure, and may simply tests rays against the primitives without first attempting to reduce the number of intersection tests that need to be performed using an acceleration structure.

Figure 2:
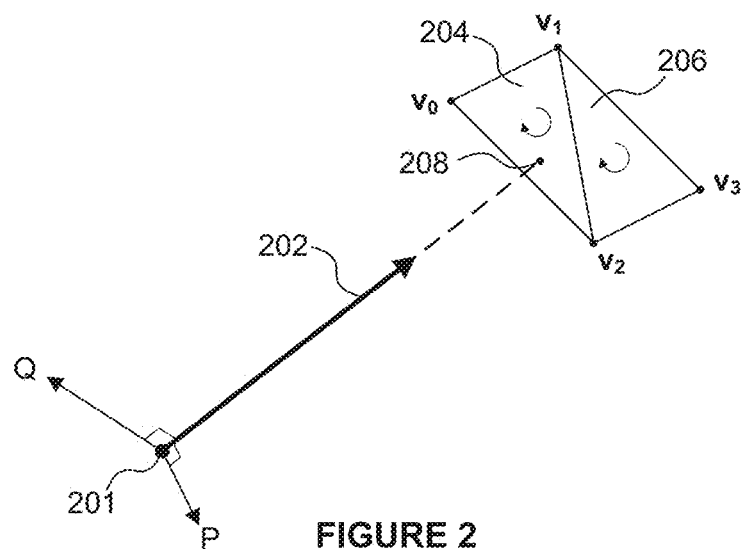
FIG. 2 shows a ray and two primitives in a scene to be rendered.

FIG. 2 illustrates a ray 202 and two primitives 204 and 206 in a scene to be rendered. The two primitives are triangles and they share an edge such that they form a quad. The number of primitives tested against in a single instance of the primitive intersection testing unit 114 could be different in different implementations. For example, the primitive intersection testing unit 114 could be a "single tester" (i.e. configured to test a ray for intersection with a single primitive at a time), a "dual tester" (i.e. configured to test a ray for intersection with a pair of primitives at a time), etc. Irrespective of the number of primitives that the primitive intersection testing unit 114 is configured to test a ray against in a single instance, the primitives should be handled in the same manner by the intersection determination logic 402. Similarly, the number of primitives that the primitive intersection testing unit 114 is configured to test a ray against in a single instance does not affect how the primitives are processed by the intersection selection logic 404. The orientations of the two primitives are indicated as clockwise, as viewed and from the ray's perspective, in FIG. 2. Primitive 204 is defined by the ordered set of vertices $(v_0, v_1, v_2)$, and primitive 206 is defined by the ordered set of vertices $(v_1, v_3, v_2)$. The edge between vertices $v_1$ and $v_2$ is shared by primitives 204 and 206. As $v_1$ and $v_2$ are defined in the opposite order in primitives 204 and 206, and therefore the edge has opposite direction in one from the other, the two primitives are said to be specified with consistent winding. As described above, the ray 202, r(t), can be represented as r(t)=O+Dt, where O is a vector representing the origin 201 of the ray and D is the direction vector of the ray. In the example shown in FIG. 2, the ray 202 intersects the primitive 204 at an intersection point 208, but the ray 202 does not intersect primitive 206.

The primitive intersection testing unit(s) 114 uses a non-redundantly watertight technique to test a ray against a plurality of primitives in the scene, in turn, in order to determine whether the ray intersects each of the plurality of primitives. Different techniques may be used in different examples, and we describe one such example here. In particular it is noted that the methods described below which are performed by the intersection selection logic 404 to address double intersections could be used with other non-redundantly watertight intersection testing schemes and/or with redundantly watertight intersection testing schemes. In particular, the methods described below which are performed by the intersection selection logic 404 to address double intersections may be just as, if not more, useful for use with redundantly watertight intersection testing schemes because there will be more double intersections in those intersection testing schemes. Furthermore, the methods described below may still provide some benefit (especially in respect of Z-fighting) for any intersection testing scheme, irrespective of watertightness.

In the example non-redundantly watertight technique described herein, the primitive testing unit 114 tests a ray for intersection with a primitive by determining, for each edge of the primitive, a parameter, w, indicative of which side of the edge the ray passes on. For example, w may be a signed parameter which is determined using a function (which is referred to herein as a "2D cross product"), $f(v_i,v_j)$, of the positions of the two vertices ($v_i$ and $v_j$) defining the edge of the primitive, when projected parallel to the direction vector (D) of the ray into a 2D space having axes denoted P and Q in FIG. 2. The axes P and Q are both perpendicular to the ray direction vector D of the ray 202. The P and Q axes are not parallel to each other. The P and Q axes may, or may not, be perpendicular to each other. The origin of the pair of axes corresponds with the ray origin 201. The 2D cross product, $f(v_i,v_j)$, of the positions of two projected vertices, $v_i$ and $v_j$, defining an edge, is defined as $f(v_i,v_j)=p_iq_j-q_ip_j$, where $p_i$ and $q_i$ are components of the projected vertex $v_i$ along the respective axes of the pair of axes, and where $p_j$ and $q_j$ are components of the projected vertex $v_j$ along the respective axes of the pair of axes. In other examples, other functions of the positions of the two projected vertices defining the edge may be used to determine the parameter w. For example, the function may return the result of a comparison of $p_iq_j$ and $q_ip_j$, which would avoid performing a subtraction operation, but would not provide a magnitude for use in determining barycentric coordinates.

The sign of w for the edge of the primitive indicates whether the ray passes on the left or the right of that edge, from the edge's perspective (directed from $v_i$ to $v_j$). Passing on the "left" side of the edge corresponds to an anticlockwise rotation from the first endpoint to the second endpoint relative to the origin. Passing on the "right" side of the edge corresponds to a clockwise rotation from the first endpoint to the second endpoint relative to the origin. With the form of the "2D cross product" given above as $f=(v_i,v_j)=p_iq_j-q_ip_j$, and with a first axis (P) pointing rightwards and a second axis (Q) pointing upwards (if we look along the ray 202), left/anticlockwise corresponds to a positive result off and right/clockwise corresponds to a negative result of f. Assuming a left-handed system (as per FIG. 2), and aligning the first axis P and second axis Q with right and up respectively in projected space, means the third axis (the ray direction, D) points into the page, giving the corrected perceived orientation. In a right-handed system the third axis (the ray direction, D) points out of the page, giving the wrong perceived orientation.

In this example, the primitive intersection testing unit 114 of the intersection testing module 108 determines whether the ray intersects the primitive based on the w parameters determined for the edges of that primitive. For example, if the w parameters determined for the edges of the primitive all have the same sign then it is determined that the ray intersects the primitive; whereas if it is not the case that the w parameters determined for the edges of the primitive all have the same sign then it is determined that the ray does not intersect the primitive. In this way, the parameters determined for the edges of the primitive are used to determine whether the ray passes on the inside of the edges of the primitive, wherein it is determined that the ray intersects the primitive if it is determined that the ray passes on the inside of all of the edges of the primitive, and wherein it is determined that the ray does not intersect the primitive if it is determined that the ray passes on the outside of one or more of the edges of the primitive. For example, the w parameters determined for all of the edges of the primitive 204 in FIG. 2 will be negative which indicates that the ray passes on the right side of all of the edges from the edge's perspective (directed from $v_i$ to $v_j$). As such, it will be determined that the ray intersects primitive 204. However, for primitive 206, the w parameters determined for the edges from vertex $v_1$ to vertex $v_3$ and from vertex $v_3$ to vertex $v_2$ will be negative which indicates that the ray passes on the right side of those two edges from the edge's perspective (directed from $v_i$ to $v_j$), but the w parameter determined for the edge from vertex $v_2$ to vertex $v_1$ will be positive which indicates that the ray passes on the left side of that edge from the edge's perspective (directed from $v_2$ to $v_1$). Since the signs of the w parameters determined for the edges of the primitive 206 are not all the same, it is determined that the ray does not intersect the primitive 206.

If a ray intersects a position on a shared edge (or on a shared vertex) then the 2D cross product for that shared edge (or for those edges which include the shared vertex) is zero, i.e. $f(v_i,v_j)=p_iq_j-q_ip_j=0$. For example, the ray 202 could intersect a position on the shared edge between primitives 204 and 206, i.e. on the edge defined by vertices $v_1$ and $v_2$. As described above, in this situation, it is preferable for the intersection testing to be non-redundantly watertight. As described above, intersection testing of rays with primitives is "watertight" if it is ensured that a ray that intersects a point on a shared edge of multiple primitives or a shared vertex of a closed fan is determined to intersect at least one of the primitives which share the edge or vertex. Furthermore, intersection testing of rays with primitives is "non-redundantly watertight" if it is ensured that a ray that intersects a point on a shared edge of multiple primitives or a shared vertex of a closed fan is determined to intersect a single one of the primitives which share the edge or vertex (i.e. the ray is determined to intersect one and only one of the primitives which share the edge or vertex). As described above, the ray is tested for intersection against each primitive independently.

There are different types of scheme for implementing non-redundantly watertight intersection tests. For example, some schemes are "winding/orientation independent" which means that the if the ray intersects an edge of a primitive (e.g. if the 2D cross product for an edge is zero) then the determination of whether or not the ray intersects the primitive does not depend upon the orientation of the primitive. In these schemes, the determination may be made based on whether the edge is predominantly a top edge, a bottom edge, a left edge or a right edge of the primitive when considering the primitive in 2D space (e.g. as viewed along the ray direction vector, in the 2D space defined by the P and Q axes mentioned above and shown in FIG. 2), in such a manner that for a shared edge between two primitives, opposite intersection determination results will be made. For example, in a scheme which follows a left-top rule all edges bounding the primitive from above, or bounding the primitive from the left but precisely vertical, are considered part of the boundary of the primitive, whereas all edges bounding the primitive from below, or bounding the primitive from the right but precisely vertical, are not considered part of the boundary of the primitive.

Figure 3A:
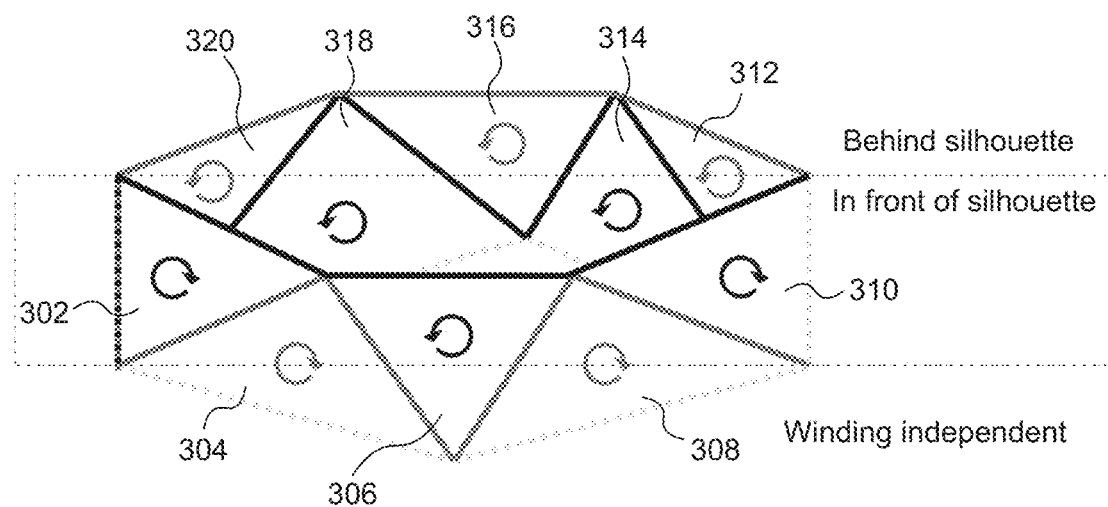
FIG. 3a shows a mesh of primitives forming a circular band with indications of which edges are considered to be part of which primitives in a "winding/orientation independent" scheme.

FIG. 3a shows a mesh of primitives 302 to 320 forming a circular band (i.e. annulus) with indications, by appropriate shading, of which edges are considered to be part of each primitive in a "winding/orientation independent" scheme.

FIG. 3a is a view of the (unprojected) primitives from a viewpoint that is slightly above the camera's origin, for a camera firing primary rays away from its origin. From the camera's origin only primitives 302 to 310 may be visible, whereas primitives 312 to 320 may be occluded by the primitives in front of them. The silhouette boundary of the primitive mesh from the viewpoint is given by the boundary between the front and back primitives, i.e. the shared edge between primitives 302 and 320 and the shared edge between primitives 310 and 312. A clockwise orientation of a front primitive has consistent winding with an anticlockwise orientation of a back primitive, and an anticlockwise orientation of a front primitive (e.g., primitive 306) would have consistent winding with a clockwise orientation of a back primitive (not shown in FIG. 3a). This can be appreciated by imagining rotating the band of primitives and considering how the orientation of each primitive changes as it transitions from being a front primitive (i.e. in front of the silhouette) to a back primitive (i.e. behind the silhouette) and vice versa. The winding order of each primitive can be inferred from its perceived orientation in FIG. 3a, and it can be seen that all of the primitives, except primitive 306, have a consistent winding order (i.e., each edge has opposite winding direction in the two primitives sharing the edge). The primitives are alternately colour coded mid grey or black for visual clarity only: the colour of a primitive is seen in FIG. 3a by the colour of the winding symbol in the interior of the primitive. A shared edge has a solid line of either black or mid grey to indicate which of the black primitive or the grey primitive sharing the edge would be hit by a ray precisely intersecting the shared edge. A dotted edge of a light grey colour indicates that no primitive shown in FIG. 3a would be hit by a ray precisely intersecting the edge. A shared edge has a dotted line of both black and mid grey to indicate that both the black primitive and the mid grey primitive sharing the edge would be hit by a ray precisely intersecting the shared edge.

A winding/orientation independent scheme ensures non-redundant watertightness within the interior of a mesh of primitives, even if the winding orders of the primitives are inconsistent. However, it can result in a lack of non-redundant watertightness, e.g., double/zero hits, on a silhouette edge of the mesh of primitives, regardless of the winding orders of the two primitives sharing the silhouette edge. For example, in FIG. 3a there are no rendering artefacts within the interior (i.e. not on the silhouette boundary) of the mesh of primitives. In particular, there are no rendering artefacts on the edges of primitive 306 even though it has an inconsistent winding order relative to the other primitives. However, on the left silhouette shared edge (i.e. the edge shared by primitives 302 and 320) both of the primitives 302 and 320 will be determined to be hit by a ray precisely intersecting the shared edge, as indicated by the black and mid grey shading of the dotted line. On the right silhouette shared edge (i.e. the edge shared by primitives 310 and 312) neither of the primitives 310 and 312 will be determined to be hit by a ray precisely intersecting the shared edge, as indicated by the light grey shading of the dotted line.

FIG. 3a shows the results of a scheme which implements a left-top rule as described above. Provided a rule is used consistently for all intersections then different rules (e.g. left-bottom, right-top, right-bottom, top-left, top-right, bottom-left and bottom-right rules) could be used and this would still maintain the non-redundantly watertight intersection determinations within the interior of the mesh of primitives, but would still result in a lack of non-redundant watertightness on the silhouette edges of the mesh of primitives.

Figure 3B:
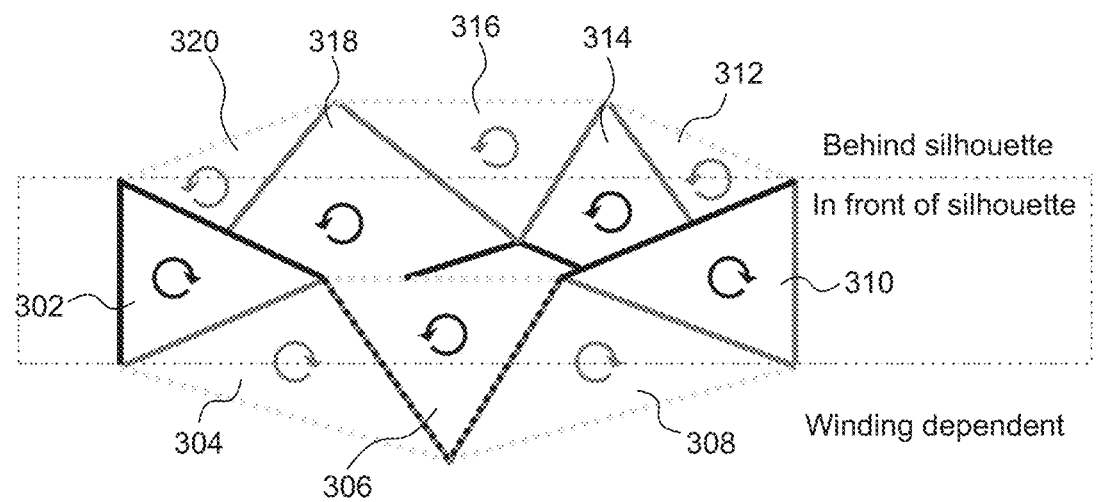
FIG. 3b shows a mesh of primitives forming a circular band with indications of which edges are considered to be part of which primitives in a "winding/orientation dependent" scheme.

FIG. 3b shows the same mesh of primitives as those shown in FIG. 3a, which form a circular band (i.e. annulus) with indications, by appropriate shading, of which edges are considered to be part of each primitive in a "winding/orientation dependent" scheme. To modify a "winding/orientation independent" scheme to a "winding/orientation dependent" scheme (and vice versa), if the ray intersects an edge of a primitive (e.g. if the 2D cross product for an edge is zero) the same methods can be used for intersection testing, but with the addition of a post-processing XOR operation on the primitive intersection determination by an indication of the orientation of the primitive. In this way, when the ray intersects an edge of a primitive, the intersection determination for the primitive is selectively reversed for the primitive in dependence upon the orientation of the primitive (from the viewpoint of the ray). For example, by comparing FIG. 3b with FIG. 3a, we can see that, on the shared edges, the intersection determinations in FIG. 3b are the same as in FIG. 3a for primitives having clockwise orientation, but the intersection determinations in FIG. 3b are the opposite of those in FIG. 3a for primitives having anticlockwise orientation.

Note that the shared silhouette edge between primitives 302 and 320, and also the shared silhouette edge between primitives 310 and 312, returns single hits only in the winding/orientation dependent scheme shown in FIG. 3b. However, due to the inconsistent winding order of primitive 306 relative to the other primitives, for the inconsistent shared edge between primitives 304 and 306, both of the primitives will be determined to be hit by a ray precisely intersecting the shared edge. Similarly, for the inconsistent shared edge between primitives 306 and 308, both of the primitives will be determined to be hit by a ray precisely intersecting the shared edge. In other examples, not shown in FIG. 3b, zero hits may occur on shared edges in the interior (i.e. not on the silhouette boundary) of a primitive mesh due to inconsistent winding. Double/zero hits can cause rendering redundancies/artefacts, respectively, at positions on such shared edges for a "winding/orientation dependent" scheme.

The occurrence of such rendering redundancies/artefacts shown in FIGS. 3a and 3b are difficult to remove universally, but they can be relocated so that they occur only at the silhouette edges of a mesh of primitives (as in FIG. 3a) or so that they only occur on shared edges between primitives with inconsistent winding (as in FIG. 3b). Visual artefacts at the silhouette edges of geometry in a rendered image are less noticeable to a viewer of the rendered image than visual artefacts in the middle of an object which may, for example in the instance of zero hits, give the appearance of the object having a hole in it, such that a background colour or occluded geometry can be seen through the object. Although visual artefacts are ameliorated, rendering redundancies, in the form or double hits, still occur. Therefore, overall, in some situations it may be considered to be preferable to move the possible rendering artefacts to the silhouette edges by using a winding/orientation independent scheme (as in FIG. 3a).

If consistent winding orders of primitives are expected (or even guaranteed) to be submitted, e.g., orientable surfaces, e.g., an annulus, then the "winding/orientation dependent" scheme (as shown in FIG. 3b) may be preferable. However, if inconsistent winding orders of primitives are expected to be submitted (or even impossible to avoid, e.g., non-orientable surfaces, e.g., a Mobius band) then the "winding/orientation independent" scheme (as shown in FIG. 3a) may be preferable.

Figure 4A:
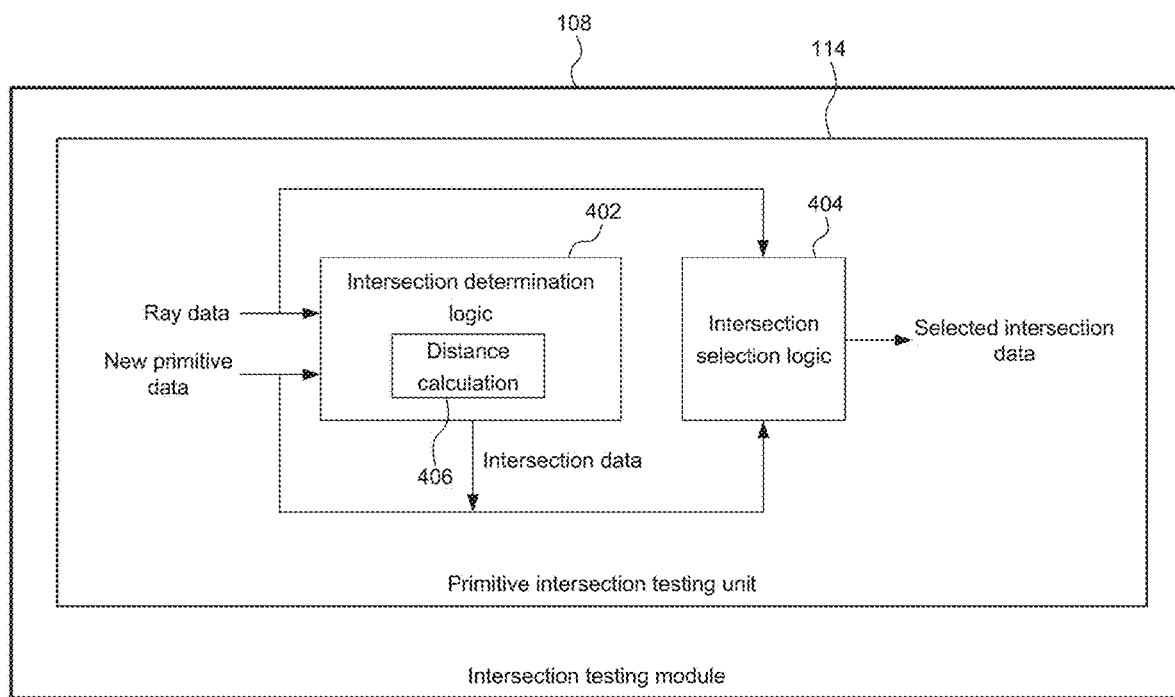
FIG. 4a shows an intersection testing module for use in a ray tracing system according to examples described herein.

FIG. 4a shows a primitive intersection testing unit 114 within the intersection testing module 108. The primitive intersection testing unit comprises intersection determination logic 402 and intersection selection logic 404, which may be implemented in hardware (e.g. in fixed function circuitry), software, firmware or a combination thereof. The intersection determination logic 402 is configured to receive ray data for a ray and primitive data defining a new primitive to be tested for intersection with the ray. The ray data may comprise the origin and direction vector of the ray, as well as other information associated with the ray such as a maximum culling distance and/or a minimum culling distance. The primitive data may comprise position data of the vertices of the primitive (e.g. projected into a 2D space, such as a space having the P and Q axes described above). The intersection determination logic 402 is configured to perform intersection testing, according to a non-redundantly watertight scheme as described above, to determine whether the ray intersects the primitive. The intersection determination logic 402 comprises distance calculation logic 406 configured to calculate an intersection distance for a determined intersection. An intersection distance of an intersection may be represented as the value of t (which may be referred to as $t_{int}$ herein) in the equation for the ray (r(t)=O+Dt) at which the intersection occurs. When a hit (i.e. an intersection) is found for a ray with a new primitive then an indication of the intersection along with data relating to the intersection is provided from the intersection determination logic 402 to the intersection selection logic 404. The intersection data comprises an intersection distance (e.g. an indication of the value of t in the equation for the ray at which the intersection occurs) as well as other data such as possibly barycentric coordinates indicating the position on the primitive at which the intersection occurs, and the orientation of the intersected primitive. If the ray has already been found to intersect with a previous primitive, the intersection selection logic 404 compares the intersection data for the new intersection with the intersection data for the previous intersection and selects one of the intersections to keep (with the other intersection being discarded). The selected intersection can be compared with subsequent intersections that are found for the ray. The intersection selection logic 404 will ideally select to keep the closer of the two intersections being compared, as indicated by the intersection distances of the two primitives. When a ray has been tested for intersection with all of the primitives that it is going to be tested against then the most recently selected intersection is the intersection that is finally determined for the ray, e.g. it represents the closest intersection for the ray with a primitive in the scene. This selected intersection can be used for rendering an image of the scene (e.g. by executing a shader program in respect of the intersection as described above with reference to the processing logic 110 shown in FIG. 1).

Figure 4B:
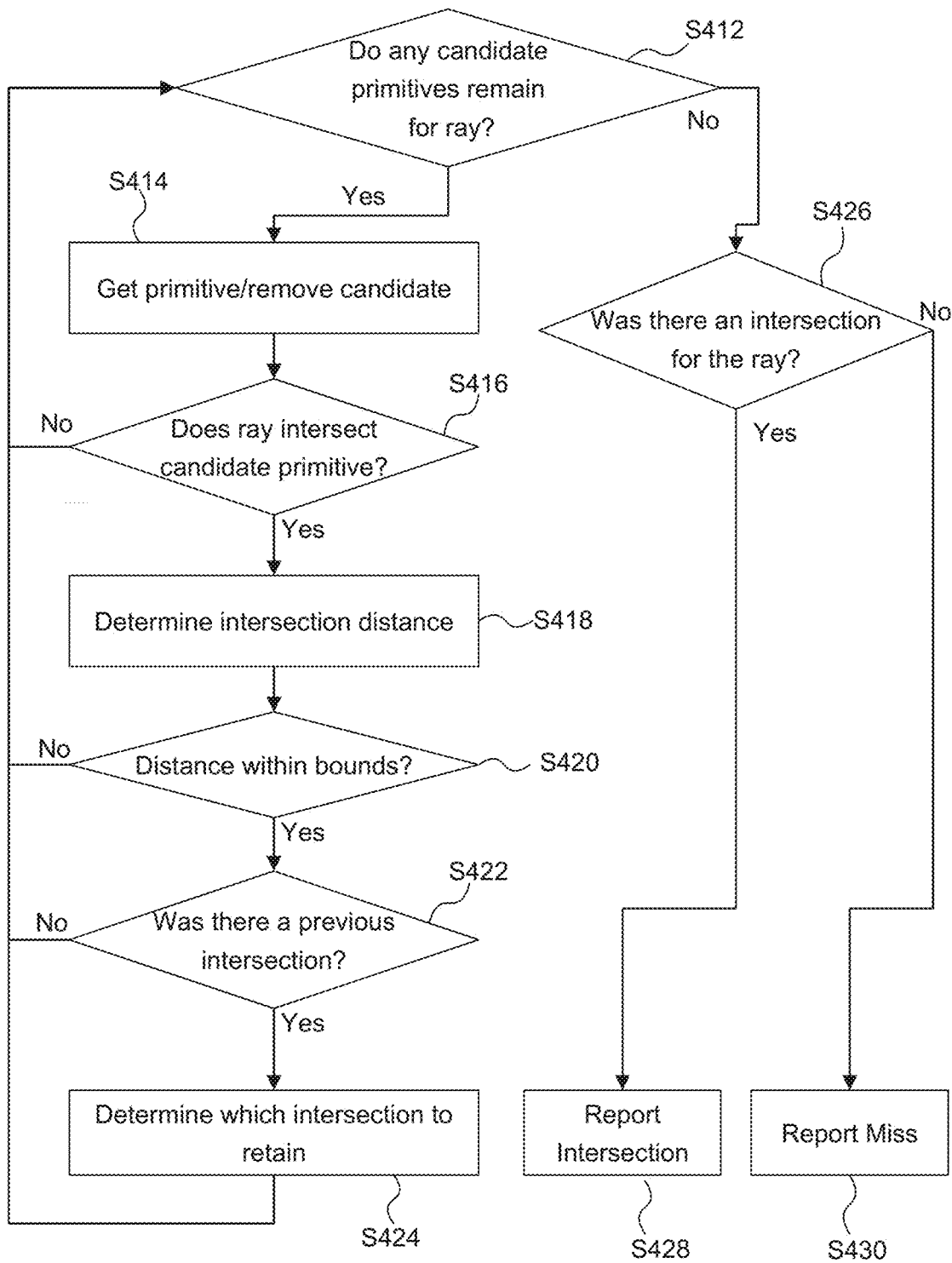
FIG. 4b is a high level flow chart showing an intersection testing process for a ray in a ray tracing system.

FIG. 4b is a high level flow chart showing an intersection testing process for a ray in a ray tracing system in which the ray is tested for intersection with multiple primitives (referred to as "candidate primitives"). In step S412 the intersection testing module 108 determines whether there are any remaining candidate primitives to be tested for intersection with the ray, e.g. using a list of remaining candidate primitives which are still to be tested for intersection with the ray. If there are then the method passes to step S414, whereas if there are not then the method passes to step S426.

In step S414 the intersection testing module 108 gets a candidate primitive and removes it from the list of remaining candidate primitives for the ray.

In step S416 the intersection testing module 108 determines whether the ray intersects the candidate primitive. If the ray does intersect the candidate primitive then the method passes to step S418, whereas if the ray does not intersect the candidate primitive then the method passes back to step S412 so that the ray can be tested against the next candidate primitive for the ray (if any remain).

In step S418 the intersection testing module 108 determines an intersection distance at which the ray intersects the candidate primitive.

In step S420 the intersection testing module 108 determines whether the intersection distance is between the minimal and maximal culling distances. If the intersection distance is between the minimal and maximal culling distances (possibly including neither, either or both of the minimal and maximal distances themselves) then the method proceeds to step S422, whereas if the intersection distance is not between the minimal and maximal culling distances (possibly including neither, either or both of the minimal and maximal distances themselves) then the method passes back to step S412 so that the ray can be tested against the next candidate primitive for the ray (if any remain).

In step S422 the intersection testing module 108 determines whether there has been a previous intersection determined for the ray with another primitive. If there has been a previous intersection determined for the ray with another primitive then the method passes to step S424. If there has not been a previous intersection determined for the ray with another primitive then the intersection distance for the current intersection is stored and the method passes back to step S412 so that the ray can be tested against the next candidate primitive for the ray (if any remain).

In step S424 the intersection testing module 108 determines which intersection to retain, i.e. the current intersection or the previously determined intersection for the ray. Often the closer of the intersections will be selected to be retained. Details of how the determination of which intersection to retain can be performed are described below with reference to the flow charts of FIGS. 5, 8 and 10. Following step S424 the method passes back to step S412 so that the ray can be tested against the next candidate primitive for the ray (if any remain).

As described above, if it is determined in step S412 that there are no remaining candidate primitives to be tested for intersection with the ray then the method passes to step S426. In step S426 it is determined whether an intersection has been found for the ray. If an intersection has been found for the ray then the method passes to step S428, whereas if an intersection has not been found for the ray then the method passes to step S430. In step S428 an intersection is reported. In step S430 a miss is reported.

It can be seen that in the method shown in FIG. 4b, a ray is tested for intersection with multiple candidate primitives, and intersections are compared such that one intersection is retained for the ray. The following description provides examples of how two intersections for a ray with two respective primitives can be compared so that one of the intersections can be selected, e.g. for use in the ray tracing system for rendering an image of a 3D scene.

Pre-culling of primitives that fall outside of a user supplied distance range may occur in either intersection determination logic 402 or intersection selection logic 404, or in its own intermediate stage (not shown in FIG. 4a but shown as step S420 in FIG. 4b). The distance range may be given as $[t_{min}, t_{max}]$, $(t_{min}, t_{max})$, $[t_{min}, t_{max})$ or $(t_{min}, t_{max}]$, where it is noted that when representing a range, square brackets indicate that the endpoints are included in the range, whereas round brackets indicate that the endpoints are excluded from the range. This culling can be considered part of the "hit" determination output from the intersection determination substage, i.e., hit $\&=(t_{min} \leq t_{int} \leq t_{max})$, or hit $\&=(t_{min}<t_{int}<t_{max})$, or hit $\&=(t_{min} \leq t_{int}<t_{max})$, or hit $\&=(t_{min}<t_{int} \leq t_{max})$, and therefore is independent of intersection selection, unless the value $t_{max}$ is used to store the intersection distance of a previously intersected primitive as input to intersection selection, in which case the standard less than or equal, or less than, comparison may be replaced with the comparison logic of the intersection selection logic 404 described herein. Similarly, if $t_{min}$ is used to handle transparent and/or translucent geometry, then its less than or equal, or less than, comparison may be replaced by the comparison logic of the intersection selection logic 404 described herein.

However, it is possible for a ray to be found to intersect two (or more) primitives at the same intersection distance, e.g. when a ray intersects a shared edge or a shared vertex of two (or more) primitives. The non-redundantly watertight intersection testing performed by the intersection determination logic 402 reduces the situations in which multiple intersections are found at the same intersection distance. However, even when the non-redundantly watertight intersection testing schemes described above are used by the intersection determination logic, there are still some situations in which, a double intersection can be found on shared edges of primitives, and in which the two intersection distances are equal. Since the intersection determination logic 402 only considers primitives locally, e.g., a single primitive at a time if it is implemented as a "single tester", or a pair of primitives at a time if it is implemented as a "dual tester", etc., it cannot remove all of the situations in which double intersections could occur. For example, in the winding/orientation independent example shown in FIG. 3a, a double intersection will be found when a ray intersects the left silhouette edge of the band of primitives (i.e. the edge shared by primitives 302 and 320), and in the winding/orientation dependent example shown in FIG. 3b, a double intersection will be found when a ray intersects the edge shared by primitives 304 and 306, and when a ray intersects the edge shared by primitives 306 and 308.

Enabling back-face culling could be used to resolve some of the double intersections (e.g. on the left silhouette edge of the example shown in FIG. 3a), but users may choose not to enable back-face culling for one of many reasons, e.g. due to potential gains in traversal speeds (as intersecting back-facing geometry may lead to more culling due to earlier box misses), and/or to provide support for intra-surface rays to model effects such as refraction and subsurface scattering. So it would be beneficial to have a method which can resolve the double intersections without back-face culling being enabled.

The problematic cases in which double intersections occur on shared edges in the examples shown in FIGS. 3a and 3b, are when the two primitives sharing the edge have different orientations. Orientation is a view-dependent property, i.e., it depends on both the primitive and the ray. In the winding/orientation independent example shown in FIG. 3a, the winding of the primitives 302 and 320 is consistent, but the orientation of the two primitives is different from the viewpoint of the ray because primitive 302 is front-facing whereas primitive 320 is back-facing. Therefore, as shown in FIG. 3a, primitives 302 and 320 have different orientations, in particular primitive 302 has a clockwise orientation and primitive 320 has an anticlockwise orientation. In the winding/orientation dependent example shown in FIG. 3b, the winding of the primitive 306 is inconsistent with the winding of the other primitives in the mesh, so the orientation of primitive 306 is different from the orientation of the primitives 304 and 308 from the viewpoint of the ray. In particular primitives 304 and 308 have a clockwise orientation and primitive 306 has an anticlockwise orientation.

In examples described herein, if a double intersection is found by the intersection determination logic 404 (e.g. using one of the redundantly watertight intersection testing schemes described above) then the intersection selection logic 406 can select one of the intersections based on the orientations of the primitives which have been intersected. For example, intersections with front-facing primitives may be prioritised over intersections with back-facing primitives. A user may supply a flag to indicate whether front-facing primitives have a clockwise or an anticlockwise orientation.

Figure 5:
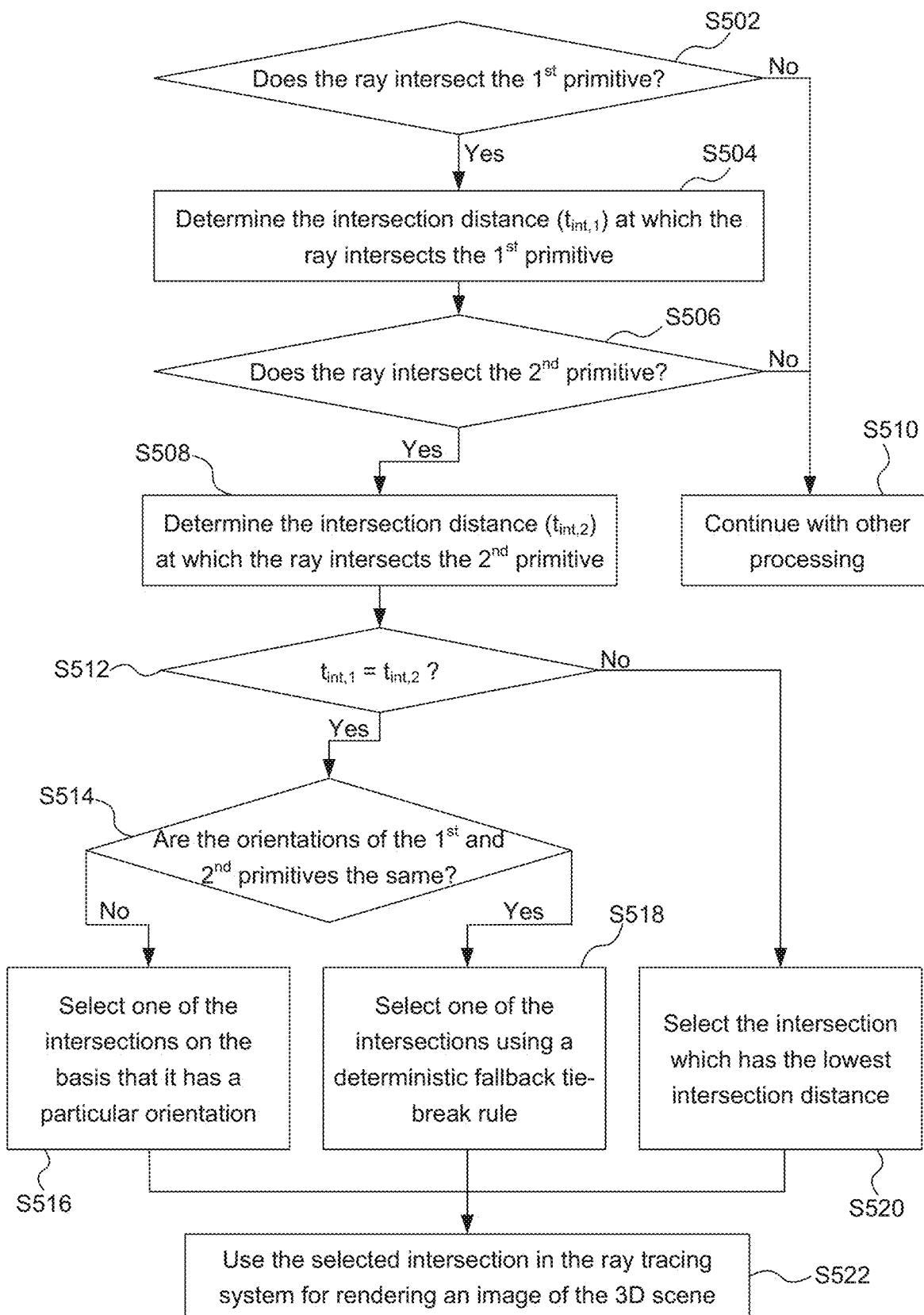
FIG. 5 is a flow chart for a first method of performing intersection testing.

FIG. 5 shows a flow chart for a first method of performing intersection testing in the ray tracing system 100. The method shown in FIG. 5 is performed for a ray by the intersection testing module 108, e.g. by the primitive intersection testing unit 114.

In step S502 the intersection determination logic 402 determines whether the ray intersects a first primitive. For example, step S502 may involve implementing a non-redundantly watertight intersection testing scheme, such as a winding/orientation independent scheme or a winding/orientation dependent scheme as described above. If it is determined in step S502 that the ray does intersect the first primitive then the method passes from step S502 to step S504, whereas if it is determined in step S502 that the ray does not intersect the first primitive then the method passes from step S502 to step S510.

In step S504 the intersection determination logic 402 (e.g. the distance calculation logic 406) determines the intersection distance ($t_{int,1}$) at which the ray intersects the first primitive. The intersection determination logic may also determine other intersection data relating to the intersection of the ray with the first primitive, such as barycentric coordinates indicating the position on the first primitive at which the intersection occurs, and the orientation of the first primitive. The intersection distance ($t_{int,1}$) and other intersection data determined in step S504 for the intersection of the ray with the first primitive are passed from the intersection determination logic 402 to the intersection selection logic 404.

In step S506 the intersection determination logic 402 determines whether the ray intersects a second primitive. For example, step S506 may involve implementing a non-redundantly watertight intersection testing scheme, such as a winding/orientation independent scheme or a winding/orientation dependent scheme as described above. If it is determined in step S506 that the ray does intersect the second primitive then the method passes from step S506 to step S508, whereas if it is determined in step S506 that the ray does not intersect the second primitive then the method passes from step S506 to step S510. Step S506 may be performed immediately after step S504, or some other processing may be performed in between steps S504 and S506.

In step S508 the intersection determination logic 402 (e.g. the distance calculation logic 406) determines the intersection distance ($t_{int,2}$) at which the ray intersects the second primitive. The intersection determination logic may also determine other intersection data relating to the intersection of the ray with the second primitive, such as barycentric coordinates indicating the position on the second primitive at which the intersection occurs, and the orientation of the second primitive. The intersection distance ($t_{int,2}$) and other intersection data determined in step S508 for the intersection of the ray with the second primitive are passed from the intersection determination logic 402 to the intersection selection logic 404. Following step S508 the method proceeds to step S512.

In step S510, which is performed when the intersection determination logic 402 determines that the ray does not intersect a primitive, then the intersection testing module continues with other processing, e.g. by testing the ray for intersection with another primitive (e.g. by looping back to step S502 or step S506 in respect of the next primitive) or by testing a different ray for intersection with a primitive.

In step S512, which is performed when the intersection determination logic 402 determines that the ray intersects the first primitive and the second primitive, the intersection selection logic 404 determines whether the intersection distance ($t_{int,1}$) at which the ray intersects the first primitive is equal to the intersection distance ($t_{int,2}$) at which the ray intersects the second primitive. If it is determined in step S512 that $t_{int,1}=t_{int,2}$ then the method passes from step S512 to step S514. If it is determined in step S512 that $t_{int,1} \neq t_{int,2}$ then the method passes from step S512 to step S520.

In step S514 the intersection selection logic 404 determines whether the orientations of the first and second primitives are the same. If it is determined in step S514 that the orientations of the first and second primitives are different then the method passes from step S514 to step S516. If it is determined in step S514 that the orientations of the first and second primitives are the same then the method passes from step S514 to step S518.

So the method will perform step S516 if it is determined that $t_{int,1}=t_{int,2}$ and that the orientations of the first and second primitives are different. In step S516 the intersection selection logic 404 selects the intersection of the ray with one of the first and second primitives on the basis that said one of the first and second primitives has a particular orientation. For example, the "particular orientation" may be the orientation (either clockwise or anticlockwise) which corresponds to a front-facing primitive. In other examples, it would be possible for the particular orientation to be the orientation which corresponds to a back-facing primitive. As mentioned above, the user may set an indication (e.g. a flag) to indicate whether front-facing corresponds to clockwise or anticlockwise (and accordingly whether back-facing corresponds to anticlockwise or clockwise). In some systems the correspondence between front/back facing primitives and clockwise/anticlockwise orientations may be predetermined without the user having to set an indication (e.g. a flag).

The "particular orientation" usually corresponds to the orientation of the primitives observed by the rays being tested against the primitive. In a first sense, the "front-facing orientation" flag may be set to the orientation of primitives observed by the rays being tested against the primitive. By this first sense, the "particular orientation" is usually equal to the "front-facing orientation". In a second sense, the "front-facing orientation" may be set to the orientation of primitives observed by rays originating in the exterior of the surface (when this is well defined), regardless of the actual rays being tested against the primitive. By this second sense, the "particular orientation" is usually set to the "front-facing orientation" for rays originating in the exterior of the surface, whereas the "particular orientation" is usually set to the "back-facing orientation" for rays originating in the interior of the surface.

The selected intersection data (i.e. the intersection data for the selected intersection) is outputted from the intersection selection logic 404. Following step S516 the method passes to step S522.

The method will perform step S518 if it is determined that $t_{int,1}=t_{int,2}$ and that the orientations of the first and second primitives are the same. In step S518 the intersection selection logic 404 selects the intersection of the ray with one of the first and second primitives using a deterministic fallback tie-break rule. For example, the intersection selection logic 404 may select the intersection of the ray with one of the first and second primitives based on unique primitive IDs which are associated with the first and second primitives. Each of the primitives that is processed by the intersection testing module 108 may have a unique primitive ID, or alternatively a primitive ID can be derived from the order the primitives are submitted to the system (which may not be the same order the primitives are tested against the ray, due to the acceleration structure). In this way, the primitive IDs are used as a secondary tie-break rule which is used as a fall-back in the situation in which the intersections cannot be distinguished by the non-redundantly watertight intersection testing or by selecting an intersection based on the orientations of the intersected primitives. This secondary tie-break rule is deterministic, so the combined tie-break rule (i.e. the tie-breaking based on orientation with a fallback of tie-breaking based on primitive ID) is also deterministic, i.e., it does not depend on the process order of the primitives. This determinism means that stable results (i.e. the same results) are obtained regardless of the order in which primitives are tested for intersection against a ray. In other examples, a different fallback tie-breaking technique may be used in step S518. Any total strict order on the primitives will suffice. If the tie-breaking rule encodes a total strict ordering of the primitives then the primitive selection is deterministic. The selected intersection data (i.e. the intersection data for the selected intersection) is outputted from the intersection selection logic 404. Following step S518 the method passes to step S522.

The method will perform step S520 if it is determined that $t_{int,1} \neq t_{int,2}$. In step S520 the intersection selection logic 404 selects the intersection of the ray with the one of the first and second primitives which has the smaller intersection distance. Therefore, if $t_{int,1} < t_{int,2}$ then in step S520 the intersection selection logic 404 selects the intersection with the first primitive, whereas if $t_{int,2} < t_{int,1}$ then in step S520 the intersection selection logic 404 selects the intersection with the second primitive. The selected intersection data (i.e. the intersection data for the selected intersection) is outputted from the intersection selection logic 404. Following step S520 the method passes to step S522.

In step S522 the selected intersection is used in the ray tracing system for rendering an image of the 3D scene. For example, step S522 may include determining whether there are more primitives to be tested for intersection with the ray, and if there are then the method can loop back to step S506 which can then be performed in respect of the next primitive (wherein the primitive involved in the selected intersection for the ray is then treated as the "first primitive" and the next primitive is treated as the "second primitive"). In this way, the data for the selected intersection for the ray can be compared with subsequent intersections for the ray by the intersection testing module 108 to determine which is the closest intersection for the ray. When a closest intersection for the ray has been determined and step S522 determines that there are no more primitives to be tested for intersection with the ray then data for the closest intersection for the ray can be passed to the processing logic 110, which can execute a shader program to determine how to process the intersection. The final output of processing all of the rays in the ray tracing system may be a rendered image, which can be used in any suitable way, e.g. it can be displayed on a display, stored in a memory, or transmitted to another device, just to give some examples.

Figure 6A:
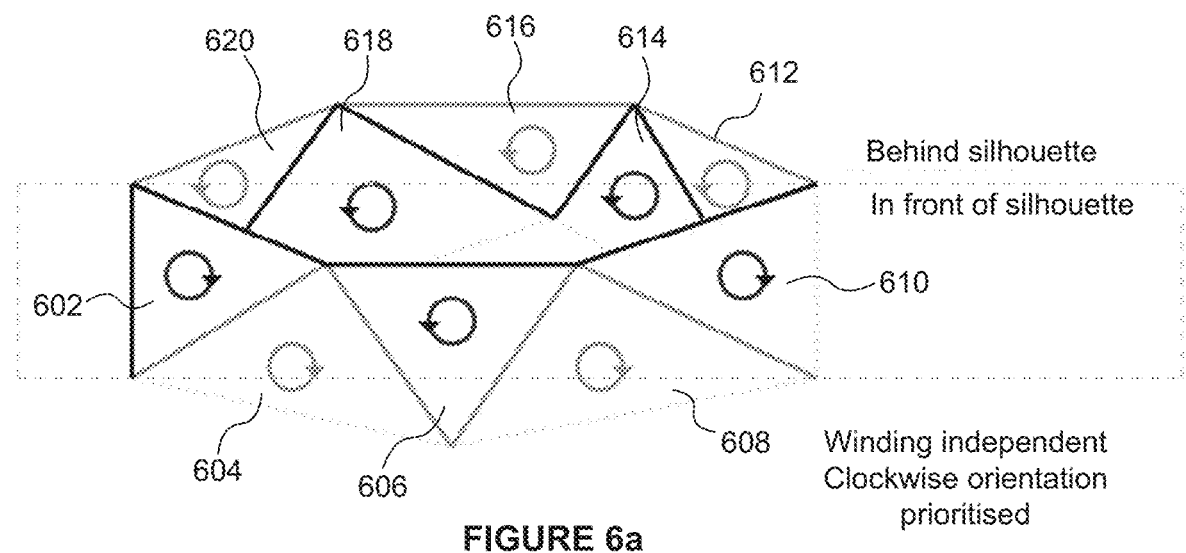
FIG. 6a shows a mesh of primitives forming a circular band with indications of which edges are considered to be part of which primitives in a "winding/orientation independent" scheme in which clockwise orientation is prioritised.

The tie-breaking method described above with reference to FIG. 5 (in particular steps S514 and S516) which distinguishes between intersections based on the orientations of the primitives involved in the intersections can be used to resolve the double intersections which cannot be resolved in all instances simultaneously using the non-redundantly watertight intersection testing schemes described above. For example, as described above, FIG. 3a shows the results of the non-redundantly watertight intersection testing scheme using a winding/orientation independent technique, and it can be seen that there is a double intersection on the left silhouette edge. FIG. 6a shows the same mesh of primitives forming a circular band (i.e. annulus) as shown in FIG. 3a, where the primitives 602 to 620 are the same as the respective primitives 302 to 320 shown in FIG. 3a, with indications, by appropriate shading, of which edges are considered to be part of each primitive. FIG. 6a, shows the result of using the tie-breaking method based on the orientation of the primitives in this situation (in which a "winding/orientation independent" scheme is used), when the clockwise orientation is prioritised (i.e. when the "particular orientation" is clockwise). It can be seen that the left silhouette edge is now shown as an intersection for primitive 602 and not for primitive 620, so a non-arbitrary primitive selection has been made resolving the double intersection on this left silhouette edge. In particular, in this example the intersection selection logic 404 selects the intersection with primitive 602 on this shared edge (and does not select the intersection with primitive 620 on this shared edge) because primitive 602 has a clockwise orientation from the viewpoint of the ray (which is the "particular orientation" in this case) whereas the primitive 620 has an anticlockwise orientation from the viewpoint of the ray (which is not the "particular orientation" in this case). All double intersections are resolved in the example shown in FIG. 6a.

Figure 6B:
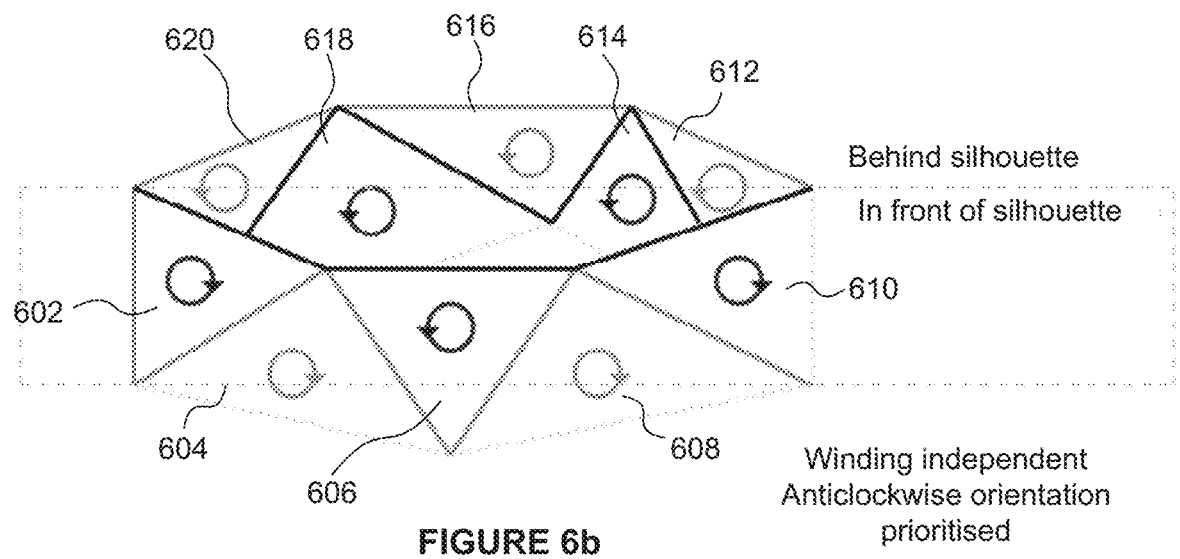
FIG. 6b shows a mesh of primitives forming a circular band with indications of which edges are considered to be part of which primitives in a "winding/orientation independent" scheme in which anticlockwise orientation is prioritised.

FIG. 6b shows the same mesh of primitives forming a circular band (i.e. annulus) as shown in FIG. 3a, where the primitives 602 to 620 are the same as the respective primitives 302 to 320 shown in FIG. 3a, with indications, by appropriate shading, of which edges are considered to be part of each primitive. FIG. 6b, shows the result of using the tie-breaking method based on the orientation of the primitives in this situation (in which a "winding/orientation independent" scheme is used), when the anticlockwise orientation is prioritised (i.e. when the "particular orientation" is anticlockwise). It can be seen that the left silhouette edge is now shown as an intersection for primitive 620 and not for primitive 602, so a non-arbitrary primitive selection has been made resolving the double intersection on this left silhouette edge. In particular, in this example the intersection selection logic 404 selects the intersection with primitive 620 on this shared edge (and does not select the intersection with primitive 602 on this shared edge) because primitive 620 has an anticlockwise orientation from the viewpoint of the ray (which is the "particular orientation" in this case) whereas the primitive 602 has a clockwise orientation from the viewpoint of the ray (which is not the "particular orientation" in this case). All double intersections are resolved in the example shown in FIG. 6b. Both of the examples shown in FIGS. 6a and 6b resolve the double intersections on the left silhouette edge, but there might be a preference for the example shown in FIG. 6a because this has prioritised the orientation which corresponds to most of the front-facing primitives of the mesh indicating how the annulus should be oriented.

Figure 6C:
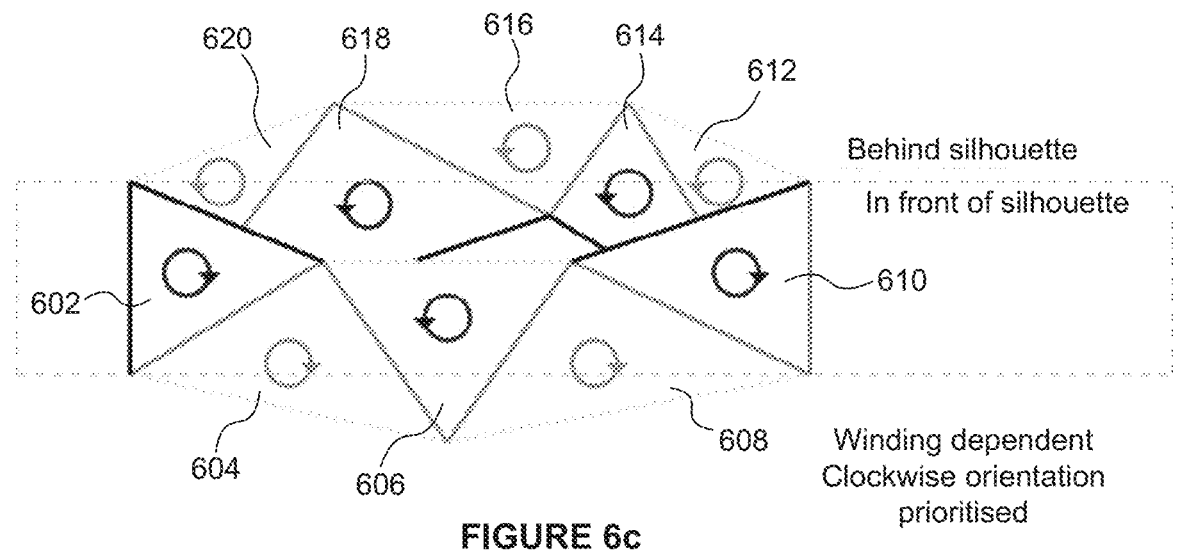
FIG. 6c shows a mesh of primitives forming a circular band with indications of which edges are considered to be part of which primitives in a "winding/orientation dependent" scheme in which clockwise orientation is prioritised.

As another example, as described above, FIG. 3b shows the results of the non-redundantly watertight intersection testing scheme using a winding/orientation dependent technique, and it can be seen that there are double intersections on the edge shared by primitives 304 and 306 and on the edge shared by primitives 306 and 308. FIG. 6c shows the same mesh of primitives forming a circular band (i.e. annulus) as shown in FIG. 3b, where the primitives 602 to 620 are the same as the respective primitives 302 to 320 shown in FIG. 3b, with indications, by appropriate shading, of which edges are considered to be part of each primitive. FIG. 6c, shows the result of using the tie-breaking method based on the orientation of the primitives in this situation (in which a "winding/orientation dependent" scheme is used), when the clockwise orientation is prioritised (i.e. when the "particular orientation" is clockwise). It can be seen that the edge shared by primitives 604 and 606 is now shown as an intersection for primitive 604 and not for primitive 606, so a non-arbitrary primitive selection has been made resolving the double intersection on this shared edge. In particular, in this example the intersection selection logic 404 selects the intersection with primitive 604 on this shared edge (and does not select the intersection with primitive 606 on this shared edge) because primitive 604 has a clockwise orientation from the viewpoint of the ray (which is the "particular orientation" in this case) whereas the primitive 606 has an anticlockwise orientation from the viewpoint of the ray (which is not the "particular orientation" in this case). Similarly, it can be seen that the edge shared by primitives 606 and 608 is now shown as an intersection for primitive 608 and not for primitive 606, so a non-arbitrary primitive selection has been made resolving the double intersection on this shared edge. In particular, in this example the intersection selection logic 404 selects the intersection with primitive 608 on this shared edge (and does not select the intersection with primitive 606 on this shared edge) because primitive 608 has a clockwise orientation from the viewpoint of the ray (which is the "particular orientation" in this case) whereas the primitive 606 has an anticlockwise orientation from the viewpoint of the ray (which is not the "particular orientation" in this case). All double intersections are resolved in the example shown in FIG. 6c.

Figure 6D:
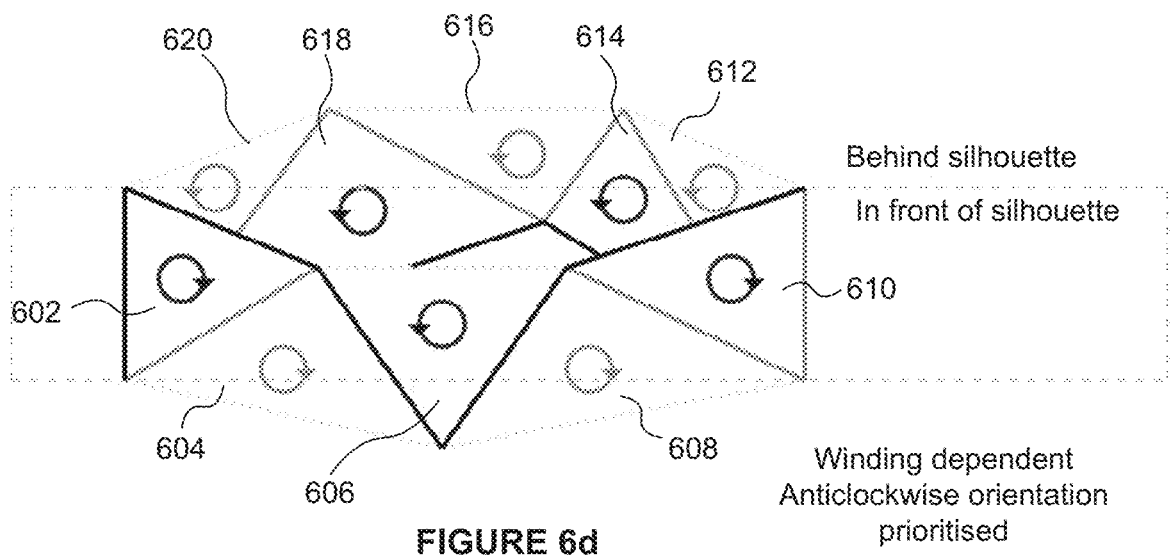
FIG. 6d shows a mesh of primitives forming a circular band with indications of which edges are considered to be part of which primitives in a "winding/orientation dependent" scheme in which anticlockwise orientation is prioritised.

FIG. 6d shows the same mesh of primitives forming a circular band (i.e. annulus) as shown in FIG. 3b, where the primitives 602 to 620 are the same as the respective primitives 302 to 320 shown in FIG. 3b, with indications, by appropriate shading, of which edges are considered to be part of each primitive. FIG. 6d, shows the result of using the tie-breaking method based on the orientation of the primitives in this situation (in which a "winding/orientation dependent" scheme is used), when the anticlockwise orientation is prioritised (i.e. when the "particular orientation" is anticlockwise). It can be seen that the edge shared by primitives 604 and 606 is now shown as an intersection for primitive 606 and not for primitive 604, so a non-arbitrary primitive selection has been made resolving the double intersection on this shared edge. In particular, in this example the intersection selection logic 404 selects the intersection with primitive 606 on this shared edge (and does not select the intersection with primitive 604 on this shared edge) because primitive 606 has an anticlockwise orientation from the viewpoint of the ray (which is the "particular orientation" in this case) whereas the primitive 604 has a clockwise orientation from the viewpoint of the ray (which is not the "particular orientation" in this case). Similarly, it can be seen that the edge shared by primitives 606 and 608 is now shown as an intersection for primitive 606 and not for primitive 608, so a non-arbitrary primitive selection has been made resolving the double intersection on this shared edge. In particular, in this example the intersection selection logic 404 selects the intersection with primitive 606 on this shared edge (and does not select the intersection with primitive 608 on this shared edge) because primitive 606 has an anticlockwise orientation from the viewpoint of the ray (which is the "particular orientation" in this case) whereas the primitive 608 has a clockwise orientation from the viewpoint of the ray (which is not the "particular orientation" in this case). All double intersections are resolved in the example shown in FIG. 6d. Both of the examples shown in FIGS. 6c and 6d resolve the double intersections on the edge shared by primitives 604 and 606 and on the edge shared by primitives 606 and 608, but there might be a preference for the example shown in FIG. 6c because this has prioritised the orientation which corresponds to most of the front-facing primitives of the mesh indicating how the annulus should be oriented.

In the examples described above with reference to the method shown in FIG. 5, the orientation-based tie-break rule comes into effect only when the intersection distances of two intersections are equal (as determined in step S512). Problems can occur even when the determined intersection distances are not exactly equal because of errors in the distance calculations (e.g. due to rounding of floating point values). For example, due to the lack of numerical precision in the primitive intersection determination and its subsequent error in the distance calculation, two theoretically equal distances may be output as different by the primitive intersection sub-stage. Furthermore, two nearly theoretically-equal distances may have their relative sizes reversed (or made equal) for the same reasons. So even if the errors in the distance calculations are small, a primitive that should be behind another primitive might actually be shown in front of that other primitive. This problem is referred to as "Z-fighting", and it causes rendering artefacts where a primitive that should be occluded by another primitive shows through (e.g., in a partial or fragmented way). As mentioned above, enabling back-face culling could avoid some of the problems caused by Z-fighting, particularly around silhouette edges (which is where the problems are often likely to occur), but users might not enable back-face culling for the reasons outlined previously, so another approach for addressing Z-fighting is desired.

For example, Z-fighting may occur for rays intersecting on or near a shared edge (e.g., on or near a silhouette boundary) when further vertices of the two primitives sharing the edge (where a "further vertex" is a vertex that is not part of the shared edge) have coordinates of very different magnitudes. The coordinate values may be represented in a floating-point format. A primitive with a further vertex having a coordinate with a high exponent value may result in larger errors in the calculation of the intersection distance than a primitive with a further vertex having coordinates with all low exponent values, as errors are often relative to the biggest input of an arithmetic operation.

To give an example of how the intersection distance for an intersection between a ray and primitive could be calculated, it is again noted that the ray, r(t), can be represented as r(t)=O+Dt, where O is a vector representing the origin of the ray and D is the direction vector of the ray. As described above, barycentric coordinates (u, v, w) of an intersection point can be determined by the intersection determination logic 402. The intersection point, $r_{int}$, can be calculated by interpolating the three vertices of the intersected primitive ($v_0, v_1, v_2$) by the barycentric coordinates, i.e., $r_{int} = uv_0 + vv_1 + wv_2$. Given a ray origin O, the position of $r_{int}$ relative to the ray origin O, given by $r'_{int}$, is $r'_{int} = r_{int} - O$. The Euclidean distance between O and $r_{int}$ is the intersection distance and is given by $t' = |r_{int} - O| = |r'_{int}|$. If the intersection distance is to be given as a (signed) multiple of ray lengths (which is often the preferred form), the final rescaled distance $t_{int}$ is given by $t_{int} = t'1/|D|$, which is correct up to sign. This is just one example of how to calculate the intersection distance for an intersection, and other methods may be used in other examples.

Figure 7A:
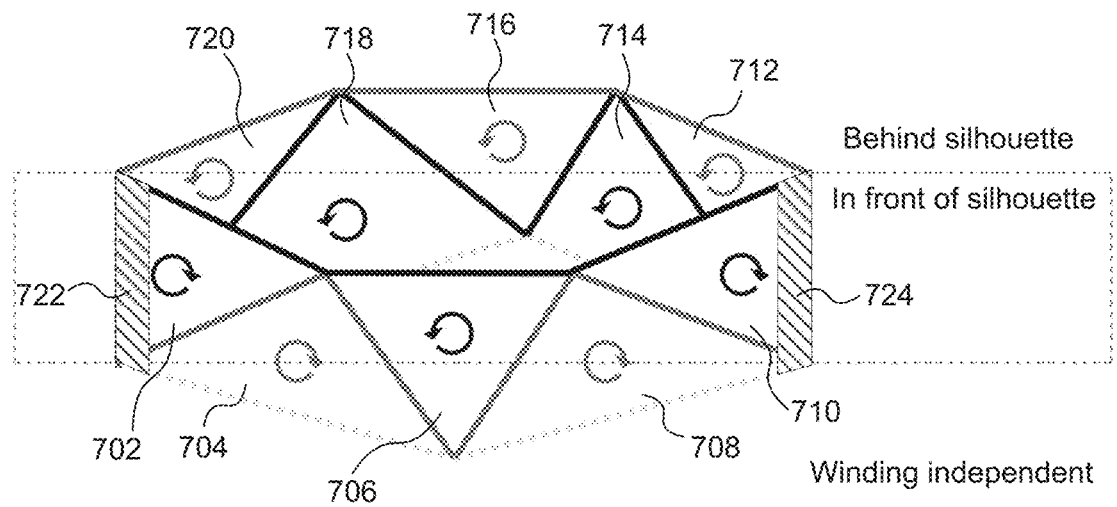
FIG. 7a shows a mesh of primitives forming a circular band with indications of which edges are considered to be part of which primitives in a "winding/orientation independent" scheme illustrating regions in which Z fighting is likely to occur.
Figure 7B:
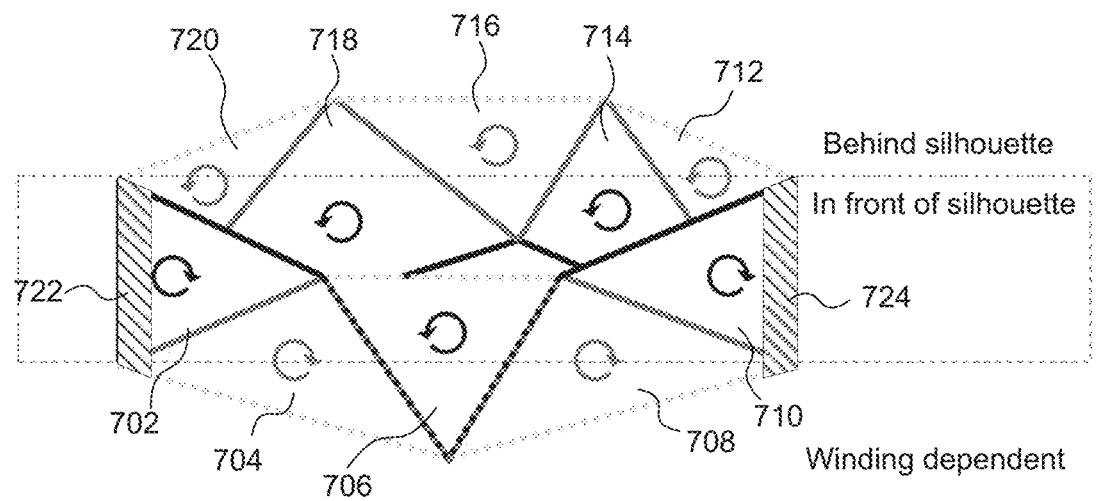
FIG. 7b shows a mesh of primitives forming a circular band with indications of which edges are considered to be part of which primitives in a "winding/orientation dependent" scheme illustrating regions in which Z fighting is likely to occur.

FIGS. 7a and 7b show regions which are likely to suffer from Z-fighting in the examples described above. In particular, FIG. 7a shows the same mesh of primitives forming a circular band (i.e. annulus) as shown in FIG. 3a, where the primitives 702 to 720 are the same as the respective primitives 302 to 320 shown in FIG. 3a in a winding/orientation independent example, with indications, by appropriate shading, of which edges are considered to be part of each primitive. Similarly, FIG. 7b shows the same mesh of primitives forming a circular band (i.e. annulus) as shown in FIG. 3b, where the primitives 702 to 720 are the same as the respective primitives 302 to 320 shown in FIG. 3b in a winding/orientation dependent example, with indications, by appropriate shading, of which edges are considered to be part of each primitive. The regions that are likely to suffer from Z-fighting are indicated with hatching and denoted 722 and 724 in FIGS. 7a and 7b. The locations of these regions depend only on the spatial sets defined by the geometry and not on their orientations, so are the same for both winding/orientation independent and winding/orientation dependent schemes, as shown in FIGS. 7a and 7b respectively.

As mentioned above, intersections close to (or on) a silhouette boundary or a shared edge between primitives which are at a highly acute angle to each other or very near to (or on) a silhouette boundary (e.g., a silhouette edge or silhouette vertex), are likely candidates for Z-Fighting to occur. It is noted that the regions 722 and 724 in FIGS. 7a and 7b include their respective shared edges.

Figure 8:
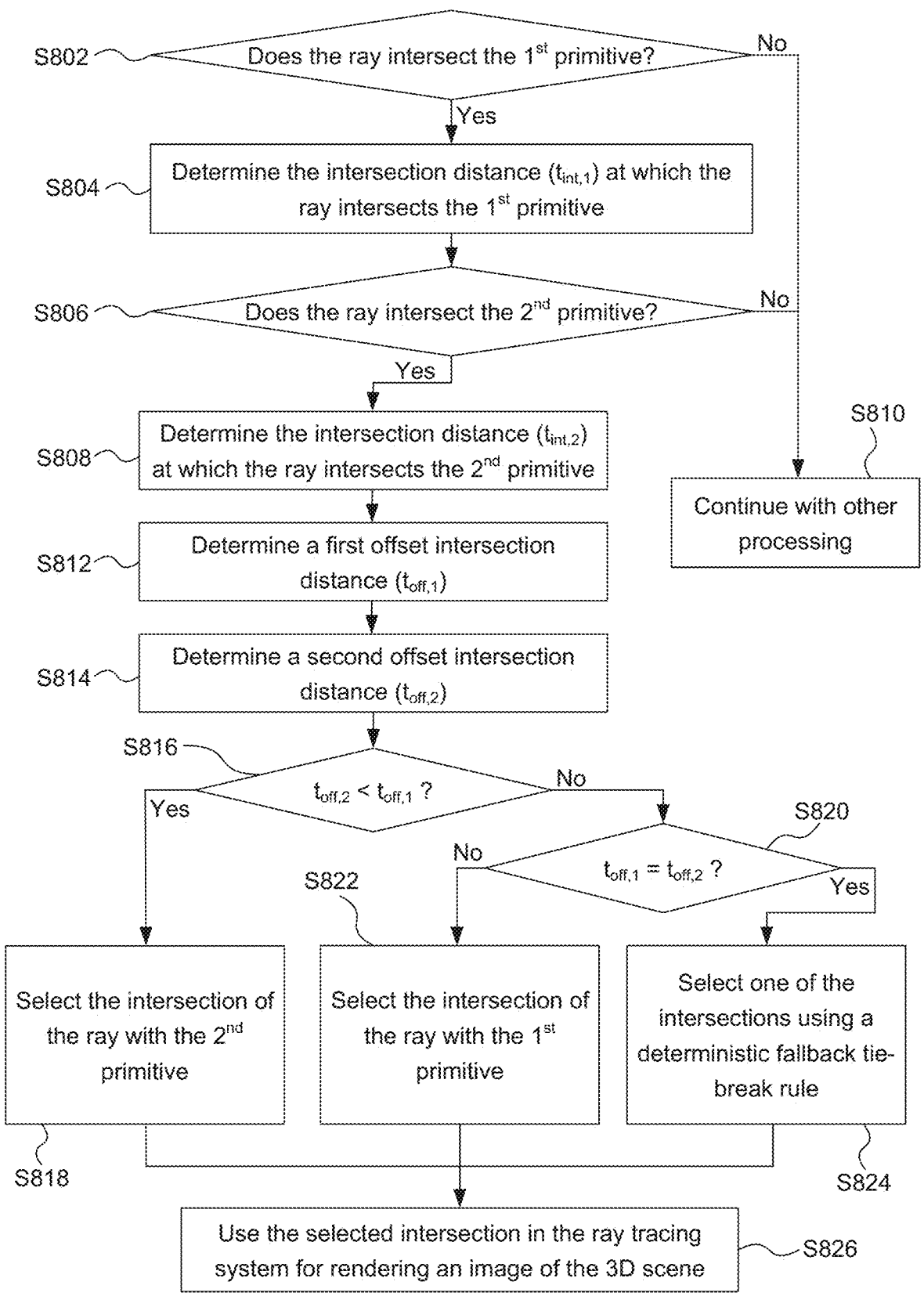
FIG. 8 is a flow chart for a second method of performing intersection testing.

FIG. 8 shows a flow chart for a second method of performing intersection testing in the ray tracing system 100. The method shown in FIG. 8 is performed for a ray by the intersection testing module 108, e.g. by the primitive intersection testing unit 114.

Steps S802 to S810 are the same as steps S502 to S510 shown in FIG. 5 and described above. In particular, in step S802 the intersection determination logic 402 determines whether the ray intersects a first primitive, e.g. using a non-redundantly watertight intersection testing scheme, such as a winding/orientation independent scheme or a winding/orientation dependent scheme as described above. If it is determined in step S802 that the ray does intersect the first primitive then the method passes from step S802 to step S804, whereas if it is determined in step S802 that the ray does not intersect the first primitive then the method passes from step S802 to step S810.

In step S804 the intersection determination logic 402 (e.g. the distance calculation logic 406) determines the intersection distance ($t_{int,1}$) at which the ray intersects the first primitive. The intersection determination logic may also determine other intersection data relating to the intersection of the ray with the first primitive, such as barycentric coordinates indicating the position on the first primitive at which the intersection occurs, and the orientation of the first primitive. The intersection distance ($t_{int,1}$) and other intersection data determined in step S804 for the intersection of the ray with the first primitive are passed from the intersection determination logic 402 to the intersection selection logic 404.

In step S806 the intersection determination logic 402 determines whether the ray intersects a second primitive, e.g. using a non-redundantly watertight intersection testing scheme, such as a winding/orientation independent scheme or a winding/orientation dependent scheme as described above. If it is determined in step S806 that the ray does intersect the second primitive then the method passes from step S806 to step S808, whereas if it is determined in step S806 that the ray does not intersect the second primitive then the method passes from step S806 to step S810. Step S806 may be performed immediately after step S804, or some other processing may be performed in between steps S804 and S806.

In step S808 the intersection determination logic 402 (e.g. the distance calculation logic 406) determines the intersection distance ($t_{int,2}$) at which the ray intersects the second primitive. The intersection determination logic may also determine other intersection data relating to the intersection of the ray with the second primitive, such as barycentric coordinates indicating the position on the second primitive at which the intersection occurs, and the orientation of the second primitive. The intersection distance ($t_{int,2}$) and other intersection data determined in step S808 for the intersection of the ray with the second primitive are passed from the intersection determination logic 402 to the intersection selection logic 404. Following step S808 the method proceeds to step S812.

In step S810, which is performed when the intersection determination logic 402 determines that the ray does not intersect a primitive, then the intersection testing module continues with other processing, e.g. by testing the ray for intersection with another primitive (e.g. by looping back to step S802 or step S806 in respect of the next primitive) or by testing a different ray for intersection with a primitive.

In step S812, the intersection selection logic 404 determines a first offset intersection distance ($t_{off,1}$) which is equal to a sum of the intersection distance ($t_{int,1}$) at which the ray intersects the first primitive and a first offset ($\delta_1$) which is dependent upon the orientation of the first primitive. For example, the first offset, $\delta_1$, may be non-zero, in which case step S812 may involve performing an addition (or subtraction) operation to add $t_{int,1}$ and $\delta_1$ together. The first offset $\delta_1$ may be positive or negative. The first offset $\delta_1$ may be a relative offset to $t_{int,1}$, i.e., it may scale with the exponent of the floating-point value $t_{int,1}$. For example, the first offset $\delta_1$ may have an exponent which scales with an exponent of the intersection distance $t_{int,1}$ with which it is to be summed. In some examples, the first offset, $\delta_1$, may be zero, in which case $t_{off,1}=t_{int,1}$ and step S812 would not involve performing an addition (or subtraction) operation. It is noted that "subtraction of a positive/negative first offset" is equivalent to "addition of a negative/positive second offset" where the second offset is the negation of the first offset.

In step S814, the intersection selection logic 404 determines a second offset intersection distance ($t_{off,2}$) which is equal to a sum of the intersection distance ($t_{int,2}$) at which the ray intersects the second primitive and a second offset ($\delta_2$) which is dependent upon the orientation of the second primitive. For example, the second offset, $\delta_2$, may be non-zero, in which case step S814 may involve performing an addition (or subtraction) operation to add $t_{int,2}$ and $\delta_2$ together. The second offset $\delta_2$ may be positive or negative. The second offset $\delta_2$ may be a relative offset to $t_{int,2}$, i.e., it may scale with the exponent of the floating-point value $t_{int,2}$. For example, the second offset $\delta_2$ may have an exponent which scales with an exponent of the intersection distance $t_{int,2}$ with which it is to be summed. In some examples, the second offset, $\delta_2$, may be zero, in which case $t_{off,2}=t_{int,2}$ and step S814 would not involve performing an addition (or subtraction) operation. It is noted that, if the first offset ($\delta_1$) is non-zero, then an offset with the same sign (and optionally the same mantissa) as the first offset ($\delta_1$) is used for determining offset intersection distances for any primitives which have the same orientation as the first primitive. Furthermore, if the second offset ($\delta_2$) is non-zero, then an offset with the same sign (and optionally the same mantissa) as the second offset ($\delta_2$) is used for determining offset intersection distances for any primitives which have the same orientation as the second primitive. If the orientation of the first primitive is different to the orientation of the second primitive then the first offset ($\beta_1$) is different to the second offset ($\delta_2$), e.g., one may be zero and one may be non-zero.

If, rather than using relative offsets, absolute offsets are used then it may be the case that: (i) if the first offset ($\beta_1$) is non-zero, then an offset with the same sign, mantissa and exponent as the first offset ($\beta_1$) is used for determining offset intersection distances for any primitives which have the same orientation as the first primitive, and (ii) if the second offset ($\delta_2$) is non-zero, then an offset with the same sign, mantissa and exponent as the second offset ($\delta_2$) is used for determining offset intersection distances for any primitives which have the same orientation as the second primitive.

The intersection selection logic 404 then compares the determined first and second offset intersection distances ($t_{off,1}$ and $t_{off,2}$) to select the intersection of the ray with one of the first and second primitives. In this way the intersection selection logic 404 identifies which of the determined first and second offset intersection distances is lower, and the intersection corresponding to the identified offset intersection distance is selected.

In particular, in step S816 the intersection selection logic 404 determines whether the second offset intersection distance ($t_{off,2}$) is less than the first offset intersection distance ($t_{off,1}$).

If $t_{off,2}<t_{off,1}$ then the method passes from step S816 to step S818, whereas if $t_{off,2} \geq t_{off,1}$ then the method passes from step S816 to step S820.

In step S818 (which is performed if $t_{off,2}<t_{off,1}$) the intersection selection logic 404 selects the intersection of the ray with the second primitive. The selected intersection data (i.e. the intersection data for the selected intersection) is outputted from the intersection selection logic 404. Following step S818 the method passes to step S826.

In step S820 (which is performed if $t_{off,2} \geq t_{off,1}$) the intersection selection logic 404 determines whether the first offset intersection distance ($t_{off,1}$) equals the second offset intersection distance ($t_{off,2}$). If $t_{off,1} \neq t_{off,2}$ then the method passes from step S820 to step S822, whereas if $t_{off,1}=t_{off,2}$ then the method passes from step S820 to step S824.

In step S822 (which is performed if $t_{off,2}>t_{off,1}$) the intersection selection logic 404 selects the intersection of the ray with the first primitive. The selected intersection data (i.e. the intersection data for the selected intersection) is outputted from the intersection selection logic 404. Following step S822 the method passes to step S826.

In step S824 (which is performed if $t_{off,2}=t_{off,1}$) the intersection selection logic 404 selects the intersection of the ray with one of the first and second primitives using a deterministic fallback tie-break rule. For example, the intersection selection logic 404 may select the intersection of the ray with one of the first and second primitives based on unique primitive IDs which are associated with the first and second primitives. As described above, each of the primitives that is processed by the intersection testing module 108 may have a unique primitive ID, or alternatively a primitive ID can be derived from the order the primitives are submitted to the system (which may not be the same order the primitives are tested against the ray, due to the acceleration structure). In this way, the primitive IDs are used as a secondary tie-break rule which is used as a fall-back in the situation in which the intersections cannot be distinguished by the non-redundantly watertight intersection testing or by applying the orientation-dependent offsets to the intersection distances. This secondary tie-break rule is also deterministic, i.e. it does not depend on the process order of the primitives. In other examples, a different fallback tie-breaking technique may be used in step S824. As described above in relation to step S518, any total strict order on the primitives will suffice. If the tie-breaking rule encodes a total strict ordering of the primitives then the primitive selection is deterministic. The selected intersection data (i.e. the intersection data for the selected intersection) is outputted from the intersection selection logic 404. Following step S824 the method passes to step S826.

In step S826 the selected intersection is used in the ray tracing system for rendering an image of the 3D scene. For example, step S826 may include determining whether there are more primitives to be tested for intersection with the ray, and if there are then the method can loop back to step S806 which can then be performed in respect of the next primitive (wherein the primitive involved in the selected intersection for the ray is then treated as the "first primitive" and the next primitive is treated as the "second primitive"). In this way, the data for the selected intersection for the ray can be compared with subsequent intersections for the ray by the intersection testing module 108 to determine which is the closest intersection for the ray. When a closest intersection for the ray has been determined and step S826 determines that there are no more primitives to be tested for intersection with the ray then data for the closest intersection for the ray can be passed to the processing logic 110, which can execute a shader program to determine how to process the intersection. The final output of processing all of the rays in the ray tracing system may be a rendered image, which can be used in any suitable way, e.g. it can be displayed on a display, stored in a memory, or transmitted to another device, just to give some examples.

In examples in which absolute offsets are used, the same offset may be applied to all intersection distances for primitives with the same orientation. In examples in which relative offsets are used, an offset with the same sign and mantissa, but different exponent (e.g., equal to the exponent of the intersection distance to which it is to be applied), may be applied to all intersection distances for primitives with the same orientation. Different offsets are applied to intersection distances for primitives with different orientations. If the first primitive has the particular orientation then the first offset ($\delta_1$) is less than if the first primitive does not have the particular orientation. Similarly, if the second primitive has the particular orientation then the second offset ($\delta_2$) is less than if the second primitive does not have the particular orientation. The difference between the offsets $\delta_1$ and $\delta_2$ (when the first and second primitives have different orientations) represents a threshold, which may be denoted $\varepsilon$, wherein $\varepsilon=|\delta_1-\delta_2|$. It is noted that if we are using relative offsets, then the size of the threshold, $\varepsilon$, will depend on the exponent values of both the first and second intersection distances, so $\varepsilon$ isn't necessarily a constant term. If the difference between two intersection distances is less than the threshold, and if the orientations of the primitives involved in intersections are different, then the selected intersection will be the intersection involving the primitive with a particular orientation (e.g. corresponding to a front-facing primitive). If the difference between two intersection distances is less than the threshold and nonzero, and if the orientations of the two primitives involved in intersections are the same, then the selected intersection will be the intersection involving the primitive with the smallest intersection distance. If the difference between two intersection distances is zero, and if the orientations of the two primitives involved in intersections are the same, then the selected intersection will be the intersection involving the primitive selected by the fallback tie-breaking technique. If the difference between two intersection distances is equal to the threshold, and if the orientations of the two primitives involved in intersections are different, then the selected intersection will either be the intersection involving the primitive with the smallest intersection distance or the primitive selected by the fallback tie-breaking technique, depending on whether the primitive with the closer or farther intersection distance has the particular orientation. If the difference between two intersection distances is equal to the threshold, and if the orientations of the two primitives involved in intersections are the same, then the selected intersection will be the intersection involving the primitive with the smallest intersection distance. If the difference between two intersection distances is greater than the threshold, then the selected intersection will be the intersection involving the primitive with the smallest intersection distance.

In the example shown in FIG. 8, the determination of the first offset intersection distance ($t_{off,1}$) comprises determining the intersection distance ($t_{int,1}$) at which the ray intersects the first primitive, and the determination of the second offset intersection distance ($t_{off,2}$) comprises determining the intersection distance ($t_{int,2}$) at which the ray intersects the second primitive. Furthermore, one or both of: (i) the determination of the first offset intersection distance ($t_{off,1}$) comprises offsetting the determined intersection distance ($t_{int,1}$) at which the ray intersects the first primitive by the first offset ($\delta_1$), and (ii) the determination of the second offset intersection distance ($t_{off,2}$) comprises offsetting the determined intersection distance ($t_{int,2}$) at which the ray intersects the second primitive by the second offset ($\delta_2$). It is noted that if the first offset ($\beta_1$) is zero then offsetting the determined intersection distance ($t_{int,1}$) at which the ray intersects the first primitive by the first offset ($\beta_1$) is equivalent to not performing an offsetting step. Similarly, if the second offset ($\delta_2$) is zero then offsetting the determined intersection distance ($t_{int,2}$) at which the ray intersects the second primitive by the second offset ($\delta_2$) is equivalent to not performing an offsetting step. In some examples, the offsets for primitives of one orientation are set to be zero so that some addition operations can be avoided. In particular, in some examples in which the first and second primitives have different orientations, either: (i) the first offset ($\beta_1$) is zero and the second offset ($\delta_2$) is non-zero, or (ii) the second offset ($\delta_2$) is zero and the first offset ($\delta_1$) is non-zero. In other examples in which the first and second primitives have different orientations, either: (iii) the offset of the primitive with the particular orientation is zero and the offset of the primitive without the particular orientation is strictly positive, or (iv) the offset of the primitive without the particular orientation is zero and the offset of the primitive with the particular orientation is strictly negative.

It can be appreciated that in the method shown in FIG. 8, the intersection selection logic 404 adds either a (small) absolute or a (small) relative offset (e.g., a small number of units of least precision (ULPs)) to the result of the intersection distance calculation, based on the orientation of the intersected primitive output from the intersection determination logic 402. The offset can either be added to one orientation or subtracted from the other, the two approaches having the same effect in terms of the relative order of the intersection distances (i.e., primitive selection). It is noted that subtracting a positive offset is equivalent to adding a negative offset. In the case of (small) relative offsets, the offsets may be added to the mantissa of a floating point value representing an intersection distance independently of the exponent of that floating point value. In this way, the offsets have magnitudes that depend upon the exponents of the intersection distances.

By using the offsets to perform a shift along the ray direction, two nearby but disjoint primitives can be pushed far enough apart to preclude Z-Fighting. The minimal size of the offset (e.g., the minimal number of ULPs) before any Z-Fighting is resolved, may depend on the accuracy (e.g., due to rounding) of the distance calculation performed by the distance calculation logic 406 in the intersection determination logic 402. If the size of the relative offset (i.e. the difference between $\delta_1$ and $\delta_2$) is large then false results may occur due to the determination of hidden surface removal being inverted in unintentional cases. As such, the size of the relative offset (i.e. the difference between $\delta_1$ and $\delta_2$) may be set to be conservatively small such that very few false results occur, but with some Z-fighting still solved. Alternatively, the size of the relative offset (i.e. the difference between $\delta_1$ and $\delta_2$) may be set to be conservatively large so that it solves all Z-fighting at the expense of some false results (e.g., at near self-intersections). In particular, as evaluating the smallest relative offset sufficient to solve all Z-fighting (denoted the optimal offset) may be infeasible, a conservatively large value may be resorted to, accepting that excess false results may arise (e.g., at near self-intersections).

Figure 9A:
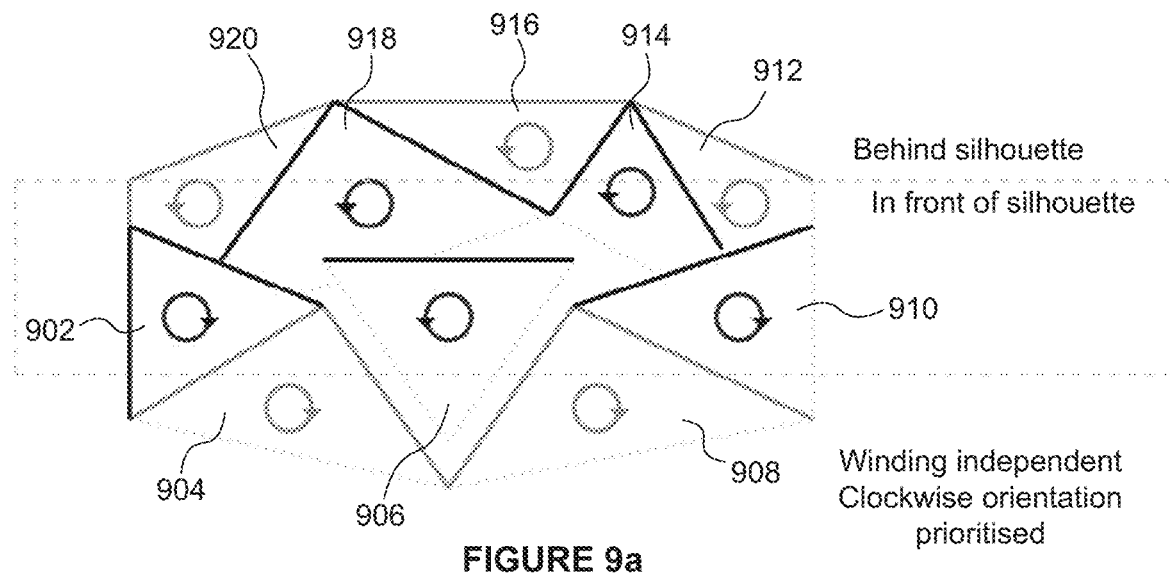
FIG. 9a shows a mesh of primitives forming a circular band with indications of which edges are considered to be part of which primitives in a "winding/orientation independent" scheme in which primitives with clockwise orientation have been offset forwards relative to primitives with anticlockwise orientation.

FIG. 9a shows the same mesh of primitives forming a circular band (i.e. annulus) as shown in FIG. 3a, where the primitives 902 to 920 are the same as the respective primitives 302 to 320 shown in FIG. 3a in which a winding/orientation independent scheme is used for intersection testing, with indications, by appropriate shading, of which edges are considered to be part of each primitive. FIG. 9a shows the (exaggerated) result of applying offsets to the intersection distances, where the offset for primitives having a clockwise orientation is less than the offset for primitives having an anticlockwise orientation. In this way, the clockwise orientation is prioritised and it has the effect of shifting the primitives with anticlockwise orientation (relative to the primitives with clockwise orientation) farther away from the ray origin. Although the left silhouette edge (i.e. the edge shared by primitives 902 and 920) is found as a double intersection by the intersection determination logic 402, the intersection selection logic 404 can select the intersection with the primitive 902 (and not select the intersection with the primitive 920) on the left silhouette edge by comparing the offset intersection distances of the two primitives on the shared edge. It can be seen in FIG. 9a that the offset intersection distance for primitive 902 is less than the offset intersection distance for primitive 920 on the edge shared by these two primitives.

Figure 9B:
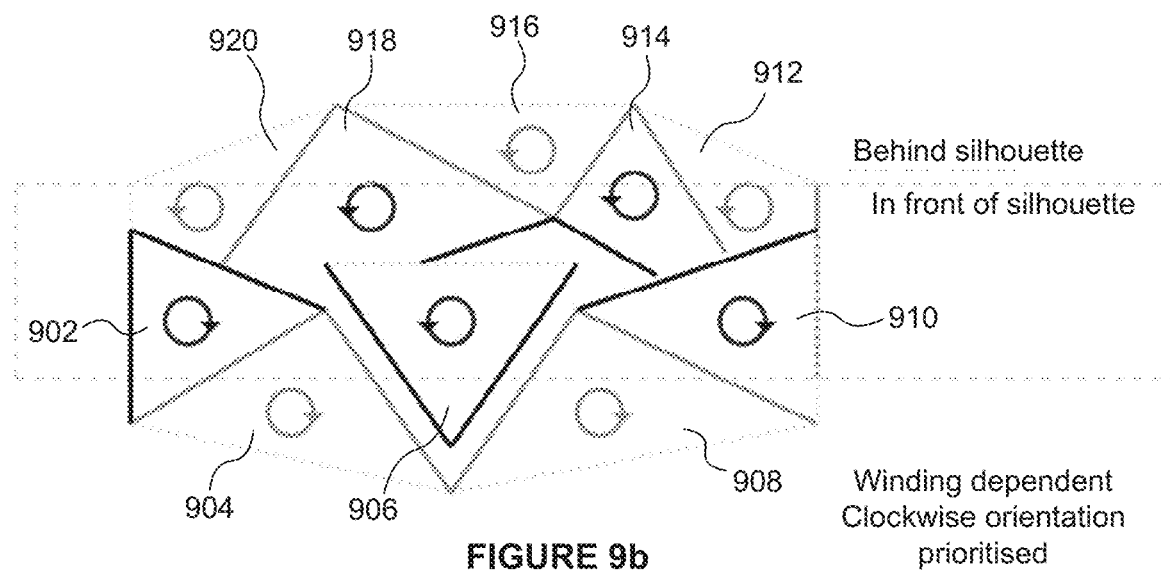
FIG. 9b shows a mesh of primitives forming a circular band with indications of which edges are considered to be part of which primitives in a "winding/orientation dependent" scheme in which primitives with clockwise orientation have been offset forwards relative to primitives with anticlockwise orientation.

FIG. 9b shows the same mesh of primitives forming a circular band (i.e. annulus) as shown in FIG. 3b, where the primitives 902 to 920 are the same as the respective primitives 302 to 320 shown in FIG. 3b in which a winding/orientation dependent scheme is used for intersection testing, with indications, by appropriate shading, of which edges are considered to be part of each primitive. FIG. 9b shows the (exaggerated) result of applying offsets to the intersection distances, where the offset for primitives having a clockwise orientation is less than the offset for primitives having an anticlockwise orientation. In this way, the clockwise orientation is prioritised and it has the effect of shifting the primitives with anticlockwise orientation (relative to the primitives with clockwise orientation) farther away from the ray origin. It is noted that the right silhouette edge is shown as an excluded edge (represented by the dotted light grey line of primitive 910) offset in front of an included edge (represented by the solid mid grey line of primitive 912). In FIG. 9b these two lines are visually combined where there is overlap, but it is to be understood that as the occluding edge of primitive 910 is excluded, rays pass through it to the included edge of primitive 912 behind. Although the edge shared by the primitives 904 and 906 and the edge shared by primitives 906 and 908 are found as double intersections by the intersection determination logic 402, the intersection selection logic 404 can select the intersections with the primitives 904 and 908 (and not select the intersection with the primitive 906) on these respective edges by comparing the offset intersection distances of the primitives on the shared edges. It can be seen in FIG. 9b that the offset intersection distance for primitive 904 is less than the offset intersection distance for primitive 906 on the edge shared by these two primitives, and that the offset intersection distance for primitive 908 is less than the offset intersection distance for primitive 906 on the edge shared by these two primitives.

In FIGS. 9a and 9b, the viewer's perspective is slightly above the ray origin. This means that the shift along the ray direction due to the offsets is visible in the figures, but the gaps seen between adjacent primitives of the mesh are not visible from the point of view of the ray, i.e. watertightness is still guaranteed. Furthermore, FIGS. 9a and 9b only show the situations in which the clockwise orientation is prioritised (i.e. the offset for clockwise primitives is less than the offset for anticlockwise primitives). This is because prioritising the anticlockwise orientation would be incorrect behaviour for the example meshes shown in the figures, as given by the orientation of the majority of the front-facing primitives of the annulus, indicating how the surface should be oriented. For example, prioritising the anticlockwise primitives by shifting all clockwise primitives away from the ray origin or all anticlockwise primitives towards the ray origin, would increase the Z-fighting problem. In this case, the particular orientation is incorrect, and the artefacts could be resolved by inverting the particular orientation (i.e., clockwise becomes anticlockwise, or anticlockwise becomes clockwise). For a surface, it is recommended to set the particular orientation to the orientation viewed by any ray with exterior origin (assuming this is well defined) for rays originating outside the surface (e.g., camera rays, reflection rays, shadow rays, ambient occlusion rays, etc.), and it is recommended to set the particular orientation to the orientation viewed by any ray with interior origin (assuming this is well defined) for rays originating inside the surface (e.g., refraction rays, subsurface scattering rays, etc.).

The shifting of the intersection distances by the offsets is used only for the purposes of the selection of intersections performed by the intersection selection logic 404. When an intersection distance is output from the primitive intersection testing unit 114 (e.g. as part of the selected intersection data) then the unshifted intersection distances are output for use in other parts of the ray tracing system, e.g. by shader programs executed by the processing logic 110.

Shifting all primitives of a given orientation (e.g., clockwise) towards, or all primitives of the opposite orientation (e.g., anticlockwise) away from the ray origin, and assuming the choice of particular orientation is correct, will not introduce unintentional hidden surface removal, unless there are primitives of both orientations as closest intersections (and back-face culling is off), e.g. a decal with an anticlockwise orientation applied to a surface with a clockwise orientation (as viewed by the same ray), which is a situation that can be avoided by ensuring that the surfaces in the scene have matching winding orders.

Figure 10:
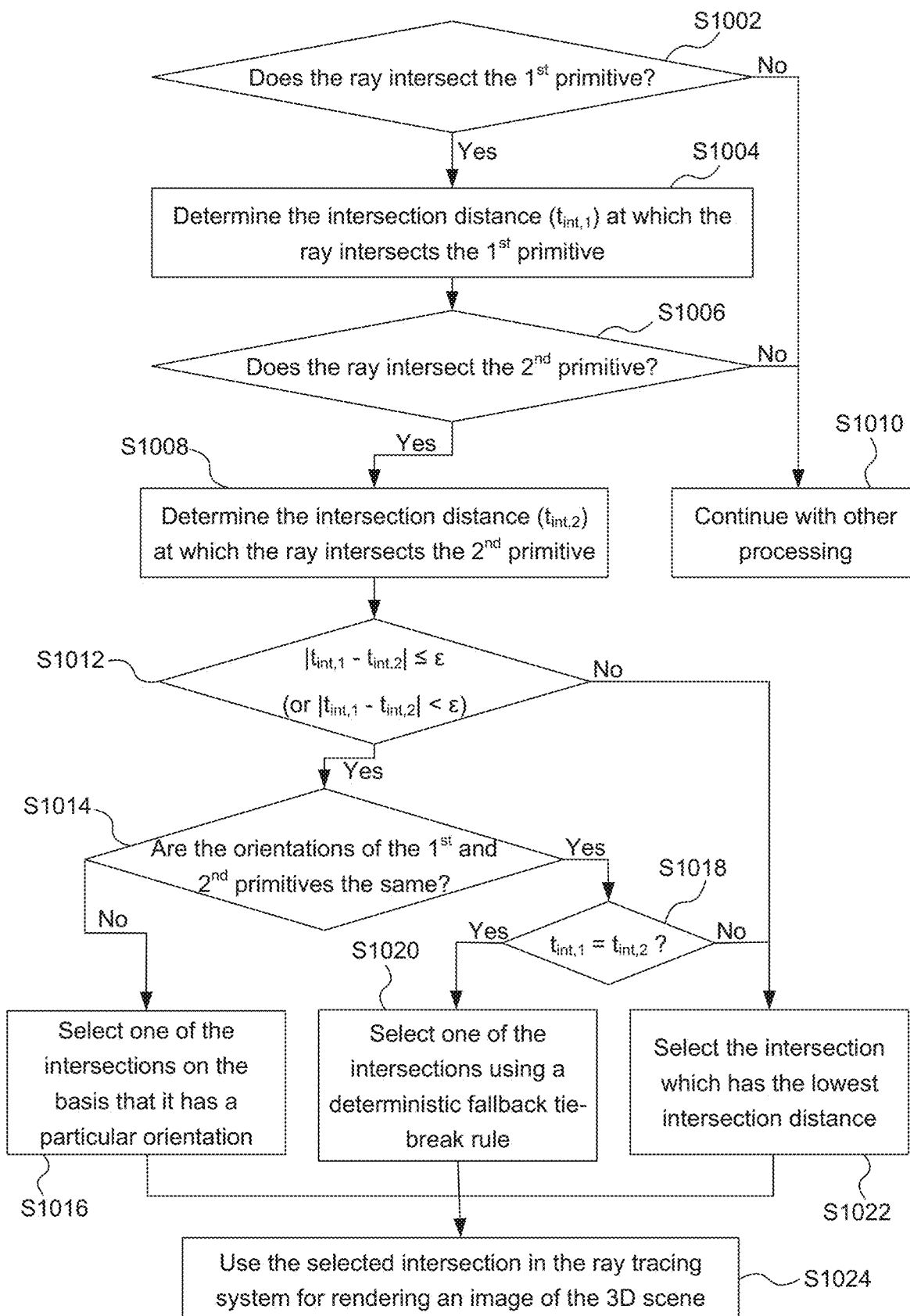
FIG. 10 is a flow chart for a third method of performing intersection testing.

As an alternative to applying the offsets to the intersection distances, the intersection selection logic 404 may instead determine whether the difference between two intersection distances is less than or equal to a threshold (or, in some examples, less than a threshold) and, if so, prioritise an intersection with a particular orientation (e.g. an orientation which corresponds to front-facing primitives). In particular, FIG. 10 shows a flow chart for a third method of performing intersection testing in the ray tracing system 100. The method shown in FIG. 10 is performed for a ray by the intersection testing module 108, e.g. by the primitive intersection testing unit 114.

Steps S1002 to S1010 are the same as steps S502 to S510 shown in FIG. 5 and as steps S802 to S810 described above. In particular, in step S1002 the intersection determination logic 402 determines whether the ray intersects a first primitive, e.g. using a non-redundantly watertight intersection testing scheme, such as a winding/orientation independent scheme or a winding/orientation dependent scheme described above. If it is determined in step S1002 that the ray does intersect the first primitive then the method passes from step S1002 to step S1004, whereas if it is determined in step S1002 that the ray does not intersect the first primitive then the method passes from step S1002 to step S1010.

In step S1004 the intersection determination logic 402 (e.g. the distance calculation logic 406) determines the intersection distance ($t_{int,1}$) at which the ray intersects the first primitive. The intersection determination logic may also determine other intersection data relating to the intersection of the ray with the first primitive, such as barycentric coordinates indicating the position on the first primitive at which the intersection occurs, and the orientation of the first primitive. The intersection distance ($t_{int,1}$) and other intersection data determined in step S1004 for the intersection of the ray with the first primitive are passed from the intersection determination logic 402 to the intersection selection logic 404.

In step S1006 the intersection determination logic 402 determines whether the ray intersects a second primitive, e.g. using a non-redundantly watertight intersection testing scheme, such as a winding/orientation independent scheme or a winding/orientation dependent scheme described above. If it is determined in step S1006 that the ray does intersect the second primitive then the method passes from step S1006 to step S1008, whereas if it is determined in step S1006 that the ray does not intersect the second primitive then the method passes from step S1006 to step S1010. Step S1006 may be performed immediately after step S1004, or some other processing may be performed in between steps S1004 and S1006.

In step S1008 the intersection determination logic 402 (e.g. the distance calculation logic 406) determines the intersection distance ($t_{int,2}$) at which the ray intersects the second primitive. The intersection determination logic may also determine other intersection data relating to the intersection of the ray with the second primitive, such as barycentric coordinates indicating the position on the second primitive at which the intersection occurs, and the orientation of the second primitive. The intersection distance ($t_{int,2}$) and other intersection data determined in step S1008 for the intersection of the ray with the second primitive are passed from the intersection determination logic 402 to the intersection selection logic 404. Following step S1008 the method proceeds to step S1012.

In step S1010, which is performed when the intersection determination logic 402 determines that the ray does not intersect a primitive, then the intersection testing module continues with other processing, e.g. by testing the ray for intersection with another primitive (e.g. by looping back to step S1002 or step S1006 in respect of the next primitive) or by testing a different ray for intersection with a primitive.

In step S1012, the intersection selection logic 404 determines whether a difference between the intersection distance ($t_{int,1}$) at which the ray intersects the first primitive and the intersection distance ($t_{int,2}$) at which the ray intersects the second primitive is less than or equal to a threshold, $\varepsilon$. In other words the intersection selection logic 404 determines whether $|t_{int,1}-t_{int,2}| \leq \varepsilon$. If $|t_{int,1}-t_{int,2}| \leq \varepsilon$ then the method passes from step S1012 to step S1014, whereas if $|t_{int,1}-t_{int,2}| > \varepsilon$ then the method passes from step S1012 to step S1022. In this first case (where a 'less than or equal to' comparison is used) the threshold, $\varepsilon$, is greater than or equal to zero. In some examples, step S1012 could involve the intersection selection logic 404 determining whether a difference between the intersection distance ($t_{int,1}$) at which the ray intersects the first primitive and the intersection distance ($t_{int,2}$) at which the ray intersects the second primitive is less than a threshold, $\varepsilon$. In other words the intersection selection logic 404 could determine whether $|t_{int,1}-t_{int,2}| < \varepsilon$. If $|t_{int,1}-t_{int,2}| < \varepsilon$ then the method passes from step S1012 to step S1014, whereas if $|t_{int,1}-t_{int,2}| \geq \varepsilon$ then the method passes from step S1012 to step S1022. In this second case (where a 'less than' comparison is used) the threshold, $\varepsilon$, is greater than zero. Conceptually, these two approaches for step S1012 (i.e. using a 'less than or equal to' comparison, and using a 'less than' comparison) are very similar, and for fixed-mantissa floating point formats, the 'less than' comparison could be implemented as a 'less than or equal to' comparison by using a threshold $\varepsilon'$ which is reduced relative to the threshold $\varepsilon$ mentioned above by one ulp (i.e. one unit of least precision), i.e. $\varepsilon'=\varepsilon-\text{ulp}$. Similarly, for fixed-mantissa floating point formats, the 'less than or equal to' comparison could be implemented as a 'less than' comparison by using a threshold $\varepsilon''$ which is increased relative to the threshold $\varepsilon$ mentioned above by one ulp (i.e. one unit of least precision), i.e. $\varepsilon''=\varepsilon+\text{ulp}$.

In step S1014 the intersection selection logic 404 determines whether the orientations of the first and second primitives are the same. If it is determined in step S1014 that the orientations of the first and second primitives are different then the method passes from step S1014 to step S1016. If it is determined in step S1014 that the orientations of the first and second primitives are the same then the method passes from step S1014 to step S1018.

So the method will perform step S1016 if it is determined that $|t_{int,1}-t_{int,2}| \le \varepsilon$ (or alternatively that $|t_{int,1}-t_{int,2}| < \varepsilon$) and that the orientations of the first and second primitives are different. In step S1016 the intersection selection logic 404 selects the intersection of the ray with one of the first and second primitives on the basis that said one of the first and second primitives has a particular orientation. For example, the "particular orientation" may be the orientation (either clockwise or anticlockwise) which corresponds to a front-facing primitive. In other examples, it would be possible for the particular orientation to be the orientation which corresponds to a back-facing primitive. As mentioned above, the user may set an indication (e.g. a flag) to indicate whether front-facing corresponds to clockwise or anticlockwise (and accordingly whether back-facing corresponds to anticlockwise or clockwise). In some systems the correspondence between front/back facing primitives and clockwise/anti-clockwise orientations may be predetermined without the user having to set an indication (e.g. a flag). The "particular orientation" usually corresponds to the orientation of the primitives observed by the rays being tested against the primitive. In a first sense, the "front-facing orientation" flag may be set to the orientation of primitives observed by the rays being tested against the primitive. By this first sense, the "particular orientation" is usually equal to the "front-facing orientation". In a second sense, the "front-facing orientation" may be set to the orientation of primitives observed by rays originating in the exterior of the surface (when this is well defined), regardless of the actual rays being tested against the primitive. By this second sense, the "particular orientation" is usually set to the "front-facing orientation" for rays originating in the exterior of the surface, whereas the "particular orientation" is usually set to the "back-facing orientation" for rays originating in the interior of the surface. The selected intersection data (i.e. the intersection data for the selected intersection) is outputted from the intersection selection logic 404. Following step S1016 the method passes to step S1024.

The method will perform step S1018 if it is determined that $|t_{int,1}-t_{int,2}| \le \varepsilon$ (or alternatively that $|t_{int,1}-t_{int,2}| < \varepsilon$) and that the orientations of the first and second primitives are the same. In step S1018 the intersection selection logic 404 determines whether the intersection distance ($t_{int,1}$) at which the ray intersects the first primitive is equal to the intersection distance ($t_{int,2}$) at which the ray intersects the second primitive. If it is determined in step S1018 that $t_{int,1}=t_{int,2}$ then the method passes from step S1018 to step S1020. If it is determined in step S1018 that $t_{int,1} \ne t_{int,2}$ then the method passes from step S1018 to step S1022.

The method will perform step S1020 if $t_{int,1}=t_{int,2}$ and the orientations of the first and second primitives are the same. In step S1020 the intersection selection logic 404 selects the intersection of the ray with one of the first and second primitives using a deterministic fallback tie-break rule. For example, the intersection selection logic 404 may select the intersection of the ray with one of the first and second primitives based on unique primitive IDs which are associated with the first and second primitives. Each of the primitives that is processed by the intersection testing module 108 may have a unique primitive ID, or alternatively a primitive ID can be derived from the order the primitives are submitted to the system (which may not be the same order the primitives are tested against the ray, due to the acceleration structure). In this way, the primitive IDs are used as a secondary tie-break rule which is used as a fall-back in the situation in which the intersections cannot be distinguished by the non-redundantly watertight intersection testing or by selecting an intersection based on the orientations of the intersected primitives. This secondary tie-break rule is also deterministic, i.e. it does not depend on the process order of the primitives. In other examples, a different fallback tie-breaking technique may be used in step S1020. As described above in relation to step S518 and S824, any total strict order on the primitives will suffice. If the tie-breaking rule encodes a total strict ordering of the primitives then the primitive selection is deterministic. The selected intersection data (i.e. the intersection data for the selected intersection) is outputted from the intersection selection logic 404. Following step S1020 the method passes to step S1024.

The method will perform step S1022 if it is determined that $|t_{int,1}-t_{int,2}| > \varepsilon$ (or alternatively that $|t_{int,1}-t_{int,2}| \ge \varepsilon$), or if it is determined that the orientations of the first and second primitives is the same and that $t_{int,1} \ne t_{int,2}$. In step S1022 the intersection selection logic 404 selects the intersection of the ray with the one of the first and second primitives which has the smaller intersection distance. Therefore, if $t_{int,1} < t_{int,2}$ then in step S1022 the intersection selection logic 404 selects the intersection with the first primitive, whereas if $t_{int,2} < t_{int,1}$ then in step S1022 the intersection selection logic 404 selects the intersection with the second primitive. The selected intersection data (i.e. the intersection data for the selected intersection) is outputted from the intersection selection logic 404. Following step S1022 the method passes to step S1024.

In step S1024 the selected intersection is used in the ray tracing system for rendering an image of the 3D scene. For example, step S1024 may include determining whether there are more primitives to be tested for intersection with the ray, and if there are then the method can loop back to step S1006 which can then be performed in respect of the next primitive (wherein the primitive involved in the selected intersection for the ray is then treated as the "first primitive" and the next primitive is treated as the "second primitive"). In this way, the data for the selected intersection for the ray can be compared with subsequent intersections for the ray by the intersection testing module 108 to determine which is the closest intersection for the ray. When a closest intersection for the ray has been determined and step S1024 determines that there are no more primitives to be tested for intersection with the ray then data for the closest intersection for the ray can be passed to the processing logic 110, which can execute a shader program to determine how to process the intersection. The final output of processing all of the rays in the ray tracing system may be a rendered image, which can be used in any suitable way, e.g. it can be displayed on a display, stored in a memory, or transmitted to another device, just to give some examples.

In all three of the examples described in detail above (with reference to the flow charts in FIGS. 5, 8 and 10 respectively), if the difference between an intersection distance at which a ray intersects a first primitive and an intersection distance at which the ray intersects a second primitive satisfies a comparison condition with respect to a threshold, and if the orientations of the first and second primitives are different, then the intersection of the ray with the one of the first and second primitives which has a particular orientation is selected. The comparison condition may be a 'less than' condition, such that if the difference between an intersection distance at which a ray intersects a first primitive and an intersection distance at which the ray intersects a second primitive is less than a threshold, and if the orientations of the first and second primitives are different, then the intersection of the ray with the one of the first and second primitives which has a particular orientation is selected. That is, if the primitive orientation of the first and second primitives are different, then the intersection of the ray with the one of the first and second primitives which has a particular primitive orientation is selected. In other words, if the orientation of the first primitive as a whole is different from the orientation of the second primitive as a whole, then the intersection of the ray with the one of the first and second primitives which has a particular orientation, as a whole, is selected. As mentioned above, the orientation of the primitive is a view-dependent property depending on both the primitive and the ray. Thus, for the primitive orientations of the first and second primitives to be different, each primitive being intersected by a same ray that is travelling in a same direction when it intersects each primitive, one of the two primitives has a clockwise orientation and the other of the two primitives has an anticlockwise orientation. For example, the first primitive may have a clockwise orientation and the second primitive may have an anticlockwise orientation. The winding of the first primitive may be inconsistent with the winding of the second primitive. The first primitive may be a front facing primitive and the second primitive may be a back facing primitive. The comparison condition may be a 'less than or equal to' condition, such that if the difference between an intersection distance at which a ray intersects a first primitive and an intersection distance at which the ray intersects a second primitive is less than or equal to a threshold, and if the orientations of the first and second primitives are different, then the intersection of the ray with the one of the first and second primitives which has a particular orientation is selected. This concept is used in all three examples to resolve double intersections and to reduce the effects of Z-fighting. In the first example (described with reference to FIG. 5) the threshold is zero and the threshold comparison is implemented as a "less than or equal" comparison, whereas in the second and third examples (described with reference to FIGS. 8 and 10), the threshold is non-zero (e.g., strictly positive). In the second example (described with reference to FIG. 8) the threshold comparison is implemented as a "less than" comparison with regards to ε, where in that example, $\varepsilon=|\delta_1-\delta_2|$. In the third example (described with reference to FIG. 10) the threshold comparison is implemented as either a "less than or equal" or a "less than" comparison, depending on the first or second version of the method used as described above. The "particular orientation" may be the orientation which corresponds to the orientation of a front-facing primitive. In other words, in some examples, a primitive which has said particular orientation is a front-facing primitive, and a primitive which has an orientation that is different to said particular orientation is a back-facing primitive. Furthermore, in all three of the examples described in detail above (with reference to the flow charts in FIGS. 5, 8 and 10 respectively), if the difference between the intersection distance at which the ray intersects the first primitive and the intersection distance at which the ray intersects the second primitive is greater than the threshold, then the intersection of the ray with the one of the first and second primitives which has the smaller intersection distance is selected. Furthermore, in all three of the examples described in detail above (with reference to the flow charts in FIGS. 5, 8 and 10 respectively), if the intersection distance at which the ray intersects the first primitive is equal to the intersection distance at which the ray intersects the second primitive, and if the orientations of the first and second primitives are the same, then a fallback tie-breaking rule is used, e.g. an intersection of the ray with one of the first and second primitives is selected based on unique primitive IDs which are associated with the first and second primitives. That is, if the primitive orientations of the first and second primitives are the same, then the primitive orientations of the first and second primitives are not used to select an intersection of the ray with one of the first and second primitives. Instead of selecting an intersection for one of the first and second primitives that has a particular primitive orientation, a fallback tie-breaking rule is used. This means that, for each of the three examples described above the method comprises determining whether the first and second primitives have the same primitive orientation, and (i) if the primitive orientations of the first and second primitives are different, selecting the intersection of the ray with the one of the first and second primitives which has a particular primitive orientation, and (ii) if the primitive orientations of the first and second primitives are the same, not selecting the intersection of the ray with the one of the first and second primitives which has a particular primitive orientation and instead performing a fallback tie-breaking rule. In other words, if the primitive orientations of the first and second primitives are the same, the method involves selecting the intersection of the ray with one of the first and second primitives using a deterministic fallback tie-break rule instead of selecting the intersection of the ray with the one of the first and second primitives which has a particular primitive orientation. Similarly, if the primitive orientations of the first and second primitives are different, the method involves selecting the intersection of the ray with one of the first and second primitives without applying the deterministic fallback tie-break rule, and instead selecting the intersection of the ray with the one of the first and second primitives which has a particular primitive orientation.

If the difference between the intersection distance at which the ray intersects the first primitive and the intersection distance at which the ray intersects the second primitive is equal to the threshold, then either: (i) the intersection of the ray with the one of the first and second primitives with a particular orientation, (ii) the intersection of the ray with the one of the first and second primitives chosen with respect to the tie-breaking rule (e.g., based on unique primitive IDs), or (iii) the intersection with smaller intersection distance, is selected. In the first example (described above with reference to FIG. 5, in which the threshold is zero) if the intersection distances at which the ray intersects the first and second primitives are equal (i.e., the difference is equal to zero) then the primitive with a particular orientation is selected unless both orientations are the same in which case the tie-breaking rule is applied. In the second example (described above with reference to FIG. 8, in which the threshold $\varepsilon=|\delta_1-\delta_2|$) if the difference between the intersection distance at which the ray intersects the first primitive and the intersection distance at which the ray intersects the second primitive is equal to the threshold and if the orientations are not the same and the primitive with the larger intersection distance has a particular orientation then the tie-breaking rule is applied otherwise the primitive with the smaller intersection distance is selected. In the first version of the third example (as described above with reference to FIG. 10, when using a "less than or equal" comparison) if the difference between the intersection distance at which the ray intersects the first primitive and the intersection distance at which the ray intersects the second primitive is equal to the threshold then the primitive with a particular orientation is selected unless both orientations are the same in which case the smaller intersection distance is selected. In the second version of the third example (as described above with reference to FIG. 10, when using a "less than" comparison) if the difference between the intersection distance at which the ray intersects the first primitive and the intersection distance at which the ray intersects the second primitive is equal to the threshold then the primitive with the smaller intersection distance is selected.

The first method (shown in FIG. 5) and the third method (shown in FIG. 10) involve: (a) determining that the difference between the intersection distance at which the ray intersects the first primitive and the intersection distance at which the ray intersects the second primitive satisfies a comparison condition with respect to a threshold (e.g. in step S512 or S1012), (b) determining that the orientations of the first and second primitives are different (e.g. in step S514 or S1014), and (c) selecting the intersection of the ray with the one of the first and second primitives which has a particular orientation (in step S516 or S1016) in response to determining that: (i) the difference between the intersection distance at which a ray intersects a first primitive and the intersection distance at which the ray intersects a second primitive satisfies the comparison condition with respect to the threshold, and (ii) the orientations of the first and second primitives are different. In the first method (shown in FIG. 5) the threshold is zero, whereas in the third method (shown in FIG. 10) the threshold may be non-zero (e.g., strictly positive).

Figure 11:
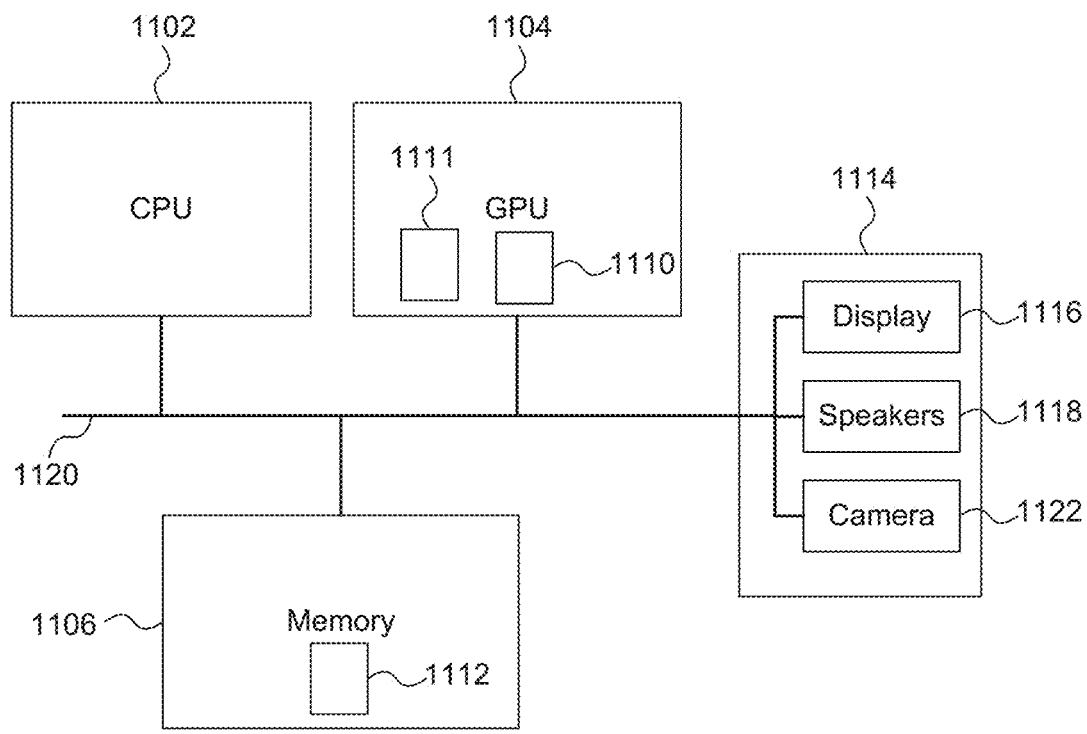
FIG. 11 shows a computer system in which a ray tracing system comprising an intersection testing module is implemented.

FIG. 11 shows a computer system in which the ray tracing systems described herein may be implemented. The computer system comprises a CPU 1102, a GPU 1104, a memory 1106 and other devices 1114, such as a display 1116, speakers 1118 and a camera 1122. A ray tracing unit 1110 (corresponding to ray tracing unit 102) is implemented on the GPU 1104, as well as a Neural Network Accelerator (NNA) 1111. In other examples, the ray tracing unit 1110 may be implemented on the CPU 1102 or within the NNA 1111 or as a separate processing unit in the computer system. The components of the computer system can communicate with each other via a communications bus 1120. A store 1112 (corresponding to memory 104) is implemented as part of the memory 1106.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The intersection testing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing module configured to perform any of the methods described herein, or to manufacture an intersection testing module comprising any apparatus described herein. An integrated circuit definition dataset may be, for example, an integrated circuit description.

Therefore, there may be provided a method of manufacturing, at an integrated circuit manufacturing system, an intersection testing module as described herein. Furthermore, there may be provided an integrated circuit definition dataset that, when processed in an integrated circuit manufacturing system, causes the method of manufacturing an intersection testing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an intersection testing module will now be described with respect to FIG. 12.

Figure 12:
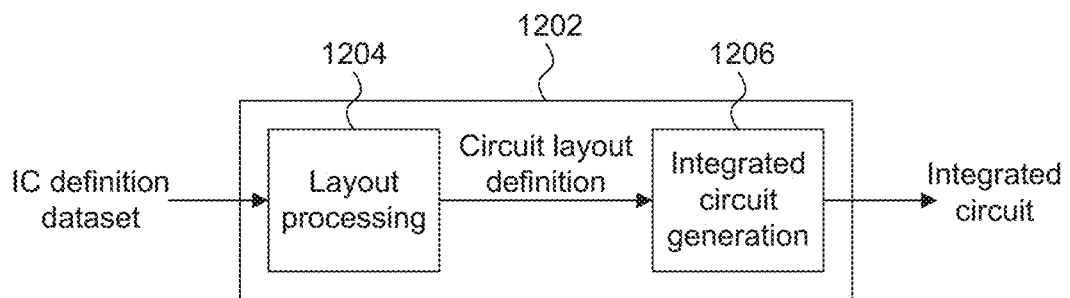
FIG. 12 shows an integrated circuit manufacturing system for generating an integrated circuit embodying an intersection testing module.

FIG. 12 shows an example of an integrated circuit (IC) manufacturing system 1202 which is configured to manufacture an intersection testing module as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining an intersection testing module as described in any of the examples herein), process the IC definition dataset, and generate an IC according to the IC definition dataset (e.g. which embodies an intersection testing module as described in any of the examples herein). The processing of the IC definition dataset configures the IC manufacturing system 1202 to manufacture an integrated circuit embodying an intersection testing module as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an intersection testing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing intersection testing in a ray tracing system, the method comprising:
   determining a first offset intersection distance which is equal to a sum of an intersection distance at which a ray intersects a first primitive and a first offset which is dependent upon the orientation of the first primitive;
   determining a second offset intersection distance which is equal to a sum of an intersection distance at which the ray intersects a second primitive and a second offset which is dependent upon the orientation of the second primitive; and
   comparing the determined first and second offset intersection distances to select the intersection of the ray with one of the first and second primitives.

2. The method of claim 1, wherein said determining the first offset intersection distance comprises determining the intersection distance at which the ray intersects the first primitive, and wherein said determining the second offset intersection distance comprises determining the intersection distance at which the ray intersects the second primitive.

3. The method of claim 2, wherein said determining the first offset intersection distance comprises offsetting the determined intersection distance at which the ray intersects the first primitive by the first offset.

4. The method of claim 2, wherein said determining the second offset intersection distance comprises offsetting the determined intersection distance at which the ray intersects the second primitive by the second offset.

5. The method of claim 1, wherein the orientation of the first primitive is different to the orientation of the second primitive, and wherein the first offset is different to the second offset.

6. The method of claim 5, wherein the first offset is zero and the second offset is non-zero.

7. The method of claim 5, wherein the second offset is zero and the first offset is non-zero.

8. The method of claim 1, wherein if the first offset is non-zero, then an offset with the same sign as the first offset is used for determining offset intersection distances for any primitives which have the same orientation as the first primitive, and
   wherein if the second offset is non-zero, then an offset with the same sign as the second offset is used for determining offset intersection distances for any primitives which have the same orientation as the second primitive.

9. The method of claim 1, wherein if the first offset is non-zero, then an offset with the same sign and mantissa as the first offset is used for determining offset intersection distances for any primitives which have the same orientation as the first primitive;
   wherein if the second offset is non-zero, then an offset with the same sign and mantissa as the second offset is used for determining offset intersection distances for any primitives which have the same orientation as the second primitive; and
   wherein each of the offsets has an exponent which scales with an exponent of the intersection distance with which it is to be summed.

10. The method of claim 1, wherein if the first offset is non-zero, then an offset with the same sign, mantissa and exponent as the first offset is used for determining offset intersection distances for any primitives which have the same orientation as the first primitive, and
    wherein if the second offset is non-zero, then an offset with the same sign, mantissa and exponent as the second offset is used for determining offset intersection distances for any primitives which have the same orientation as the second primitive.

11. The method of claim 1, wherein
    if the first primitive has a particular orientation then the first offset is less than if the first primitive does not have the particular orientation, and
    if the second primitive has the particular orientation then the second offset is less than if the second primitive does not have the particular orientation.

12. The method of claim 1, wherein said comparing the determined first and second offset intersection distances comprises identifying which of the determined first and second offset intersection distances is lower, wherein the intersection corresponding to the identified offset intersection distance is selected.

13. The method of claim 11, wherein a primitive which has said particular orientation is a front-facing primitive, and wherein a primitive which has an orientation that is different to said particular orientation is a back-facing primitive.

14. The method of claim 1, further comprising determining that the ray intersects the first and second primitives.

15. The method of claim 1, wherein if the determined first and second offset intersection distances are equal, the intersection of the ray with one of the first and second primitives is selected based on unique primitive IDs which are associated with the first and second primitives.

16. The method of claim 1, further comprising using the selected intersection in the ray tracing system for rendering an image.

17. An intersection testing module, for use in a ray tracing system, the intersection testing module comprising:
    intersection selection logic configured to:
       determine a first offset intersection distance which is equal to a sum of an intersection distance at which a ray intersects a first primitive and a first offset which is dependent upon the orientation of the first primitive;
       determine a second offset intersection distance which is equal to a sum of an intersection distance at which the ray intersects a second primitive and a second offset which is dependent upon the orientation of the second primitive; and
       compare the determined first and second offset intersection distances to select the intersection of the ray with one of the first and second primitives.

18. The intersection testing module of claim 17, further comprising intersection determination logic configured to:
    determine that the ray intersects the first primitive and determine the intersection distance at which the ray intersects the first primitive; and
    determine that the ray intersects the second primitive and determine the intersection distance at which the ray intersects the second primitive.

19. The intersection testing module of claim 17, wherein the intersection selection logic is configured to compare the determined first and second offset intersection distances to select the intersection of the ray with one of the first and second primitives by identifying which of the determined first and second offset intersection distances is lower, wherein the intersection corresponding to the identified offset intersection distance is selected.

20. A non-transitory computer readable storage medium having stored thereon an integrated circuit definition dataset that, when processed in an integrated circuit manufacturing system, configures the integrated circuit manufacturing system to manufacture an intersection testing module for use in a ray tracing system, the intersection testing module comprising:

intersection selection logic configured to:
        determine a first offset intersection distance which is equal to a sum of an intersection distance at which a ray intersects a first primitive and a first offset which is dependent upon the orientation of the first primitive;
        determine a second offset intersection distance which is equal to a sum of an intersection distance at which the ray intersects a second primitive and a second offset which is dependent upon the orientation of the second primitive; and
        compare the determined first and second offset intersection distances to select the intersection of the ray with one of the first and second primitives.

\* \* \* \* \*